(12) United States Patent
Ukuda

(10) Patent No.: US 9,835,765 B2
(45) Date of Patent: Dec. 5, 2017

(54) OPTICAL ELEMENT AND METHOD FOR MANUFACTURING THE SAME

(75) Inventor: Hideo Ukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 13/607,438

(22) Filed: Sep. 7, 2012

(65) Prior Publication Data

US 2013/0077170 A1    Mar. 28, 2013

(30) Foreign Application Priority Data

Sep. 27, 2011    (JP) .................. 2011-211112

(51) Int. Cl.
  *G02B 1/04*    (2006.01)
  *G02B 27/42*    (2006.01)
  *B29D 11/00*    (2006.01)

(52) U.S. Cl.
  CPC ............ *G02B 1/04* (2013.01); *B29D 11/0073* (2013.01); *B29D 11/00769* (2013.01); *G02B 27/4272* (2013.01)

(58) Field of Classification Search
  CPC .............. G02B 1/105; G02B 1/14; G02B 3/08
  USPC ........ 359/558, 565–576; 369/112.03–112.15
  See application file for complete search history.

(56) References Cited

U.S. PATENT DOCUMENTS

| | | | | |
|---|---|---|---|---|
| 2001/0050815 A1* | 12/2001 | Ishihara | ............... | G02B 5/1814 359/566 |
| 2002/0036827 A1* | 3/2002 | Nakai | ................. | G02B 5/1814 359/565 |
| 2005/0243423 A1* | 11/2005 | Nakai | ................. | G02B 27/0037 359/566 |
| 2007/0146625 A1* | 6/2007 | Ooi | ......................... | G02B 3/08 349/200 |
| 2008/0176041 A1* | 7/2008 | Sato | ..................... | H01L 51/0097 428/161 |
| 2008/0239493 A1* | 10/2008 | Ushigome | ............. | G02B 27/42 359/576 |
| 2009/0015142 A1 | 1/2009 | Potts | | |
| 2009/0128912 A1* | 5/2009 | Okada | ....................... | C08J 7/047 359/576 |
| 2010/0134888 A1* | 6/2010 | Korenaga | ............ | B29C 45/0053 359/576 |

(Continued)

FOREIGN PATENT DOCUMENTS

| | | |
|---|---|---|
| CN | 1440869 A | 9/2003 |
| CN | 1537249 A | 10/2004 |

(Continued)

OTHER PUBLICATIONS

A.d.Kathnnan ans S.K.Pitalo, Binary Optics in Lens Design, International Lens Design Conference, 1990, SPIE vol. 1354, p. 297-309.

*Primary Examiner* — Kimberly N Kakalec
(74) *Attorney, Agent, or Firm* — Canon U.S.A. Inc., IP Division

(57) ABSTRACT

A method for manufacturing an optical element includes the steps of: providing a first material including a precursor of a first energy curable resin which contains fine particles of a transparent conductive material on a transparent substrate, curing the first material by light irradiation, and performing a heat treatment on the cured first material. In the method described above, the cured first material processed by the heat treatment is again processed by light irradiation.

15 Claims, 10 Drawing Sheets

(56) References Cited

U.S. PATENT DOCUMENTS

2010/0134889 A1* 6/2010 Takayama ............ G02B 5/1866
  359/576
2010/0142053 A1* 6/2010 Nakabayashi ....... G02B 5/1852
  359/570

FOREIGN PATENT DOCUMENTS

| | | |
|---|---|---|
| CN | 101231357 A | 7/2008 |
| CN | 102040852 A | 5/2011 |
| EP | 1947488 A1 | 7/2008 |
| JP | 48-4178 B | 2/1973 |
| JP | 48-64183 A | 9/1973 |
| JP | 49-43191 B | 11/1974 |
| JP | 50-6034 B | 3/1975 |
| JP | 52-30490 B | 8/1977 |
| JP | 2002-296407 A | 10/2002 |
| JP | 2006-220689 A | 8/2006 |
| JP | 2006220689 A | 8/2006 |
| JP | 2006-326410 A | 12/2006 |
| JP | 2008-203821 A | 9/2008 |
| JP | 2011-085869 A | 4/2011 |
| WO | 2006/095612 A1 | 9/2006 |

* cited by examiner

OPTICAL ELEMENT AND METHOD FOR MANUFACTURING THE SAME

BACKGROUND OF THE INVENTION

Field of the Invention

The present invention relates to an optical element used for a camera, a video, and the like and a method for manufacturing an optical element.

Description of the Related Art

Heretofore, in a refractive optical system using the refraction of light, lenses formed from glass materials having different dispersion characteristics are used together in combination to reduce the chromatic aberration. For example, in the case of an object lens of a telescope or the like, a glass material having low dispersion and a glass material having high dispersion are used in combination as a positive lens and a negative lens, respectively, to correct the chromatic aberration which appears on the axis. However, in the case in which the configuration of lenses and the number thereof are limited and/or the case in which glass materials to be used are limited, it has been difficult to sufficiently correct the chromatic aberration in some cases.

A. D. Kathman and S. K. Pitalo have disclosed a technique in "Binary Optics in Lens Design", International Lens Design Conference 1990, SPIE Vol. 1354, pp. 297 to 309 (hereinafter referred to as "Non-Patent Document 1") in which a refractive optical element having a refractive surface and a diffractive optical element having a diffraction grating are used in combination to suppress the chromatic aberration with a smaller number of lenses. The technique thus disclosed utilizes a physical phenomenon that the chromatic aberration to light having a certain reference wavelength occurs in the opposite direction between a refractive surface and a diffractive surface of optical elements. In addition, by changing the period of the diffraction grating, which is continuously formed in a diffractive optical element, the same characteristic as that of an aspherical lens can be obtained.

However, one light ray incident on a diffractive optical element is divided into plural light rays of different orders by a diffraction function. At this stage, diffracted light rays of orders other than a designed order are focused on locations different from that of the light ray of the designed order, thereby causing the generation of flare.

According to Japanese Patent Laid-Open No. 2008-203821 (hereinafter referred to as "Patent Document 1"), by using an optical material having relatively low refractive index and high dispersion and an optical material having relatively high refractive index and low dispersion, a light flux in a use wavelength region is concentrated in a specific order (hereinafter referred to as "designed order"), and the intensities of diffracted light rays of diffraction orders other than the designed order are suppressed, so that the generation of flare is prevented.

In Patent Document 1, as the optical material having relatively low refractive index and high dispersion, a material having a low refractive index $n_d$ ($1.48 < n_d < 1.57$), high refractive index dispersion represented by Abbe's number $v_d$ ($14 < v_d < 28$), and a low second order dispersion characteristic $\theta_{gF}$ ($0.34 < \theta_{gF} < 0.47$) is used. In addition, as the optical material having relatively high refractive index and low dispersion, a material having a high refractive index ($1.54 < n_d < 1.63$) and low refractive index dispersion ($44 < v_d < 57$) is used. According to Patent Document 1, when the optical material having relatively low refractive index and high dispersion and the optical material having relatively high refractive index and low dispersion are formed into shapes by ultraviolet curing or the like, diffraction efficiency can be improved in a wide wavelength range over the whole visible region.

The optical material having low refractive index and high dispersion of Patent Document 1 can be obtained in such a way that after a transparent conductive metal oxide in the form of fine particles which has high refractive index dispersion and a low second order dispersion characteristic is mixed with and dispersed in a binder resin having a low refractive index to form a composite material, this composite material is cured by ultraviolet light. In addition, as the transparent conductive metal oxide, transparent conductive metal oxides, such as indium tin oxide (ITO), have been disclosed.

An optical element, such as a multilayer diffractive optical element, which partially uses a dispersion material containing fine particles of a transparent conductive material, such as ITO, shows a high diffraction efficiency state over the whole visible region. However, in use environment, the optical property, that is, the refractive index, of the dispersion material containing fine particles of a transparent conductive material is changed. By the change in the refractive index, the optical properties of the optical element are degraded. For example, in the case of a multilayer diffractive optical element, high diffraction efficiency over the whole visible region is decreased.

SUMMARY OF THE INVENTION

In consideration of the background art as described above, aspects of the present invention provide an optical element, such as a multilayer diffractive optical element, which uses a dispersion material containing fine particles of a transparent conductive material, such as ITO, and which suppresses the change in the properties (light resistance, aging resistance, and the like) caused by the environment of the optical element. Aspects of the present invention also provide a method for manufacturing an optical element.

Aspects of the present invention provide a method for manufacturing an optical element comprising: providing on a transparent substrate a first material including a precursor of a first energy curable resin which contains fine particles of a transparent conductive material; curing the first material by light irradiation; and performing a heat treatment on the cured first material. In the method described above, the cured first material processed by the heat treatment is again processed by light irradiation (hereinafter referred to as "post light irradiation" in some cases).

Aspects of the present invention also provide a method for manufacturing an optical element comprising: providing on a transparent substrate a second material including a precursor of a second energy curable resin; curing the second material by light irradiation; providing on the cured second material a first material including a precursor of a first energy curable resin which contains fine particles of a transparent conductive material; curing the first material by light irradiation; and performing a heat treatment on the cured first and second materials. In the method described above, the cured first and the second materials processed by the heat treatment are again processed by light irradiation (post light irradiation).

Aspects of the present invention also provide an optical element comprising: a first member including fine particles of a transparent conductive material on a first transparent substrate; and a second transparent substrate provided on the first member, and in this optical element, the first member is provided with a layer at a portion in contact with the air which inhibits permeation of oxygen and which has an oxygen permeability of $2.0 \times 10^{-11}$ P/cm$^3$·cm·(cm$^2$·s·cmHg)$^{-1}$ or less measured by a high-vacuum pressure difference method.

Aspects of the present invention also provide an optical element, such as a multilayer diffractive optical element, which uses a dispersion material containing fine particles of a transparent conductive material, such as ITO, and which suppresses the change in the properties (light resistance, aging resistance, and the like) caused by the environment of the optical element and a method for manufacturing an optical element.

Further features of the present invention will become apparent from the following description of exemplary embodiments with reference to the attached drawings.

DESCRIPTION OF THE EMBODIMENTS

Figure 1A:
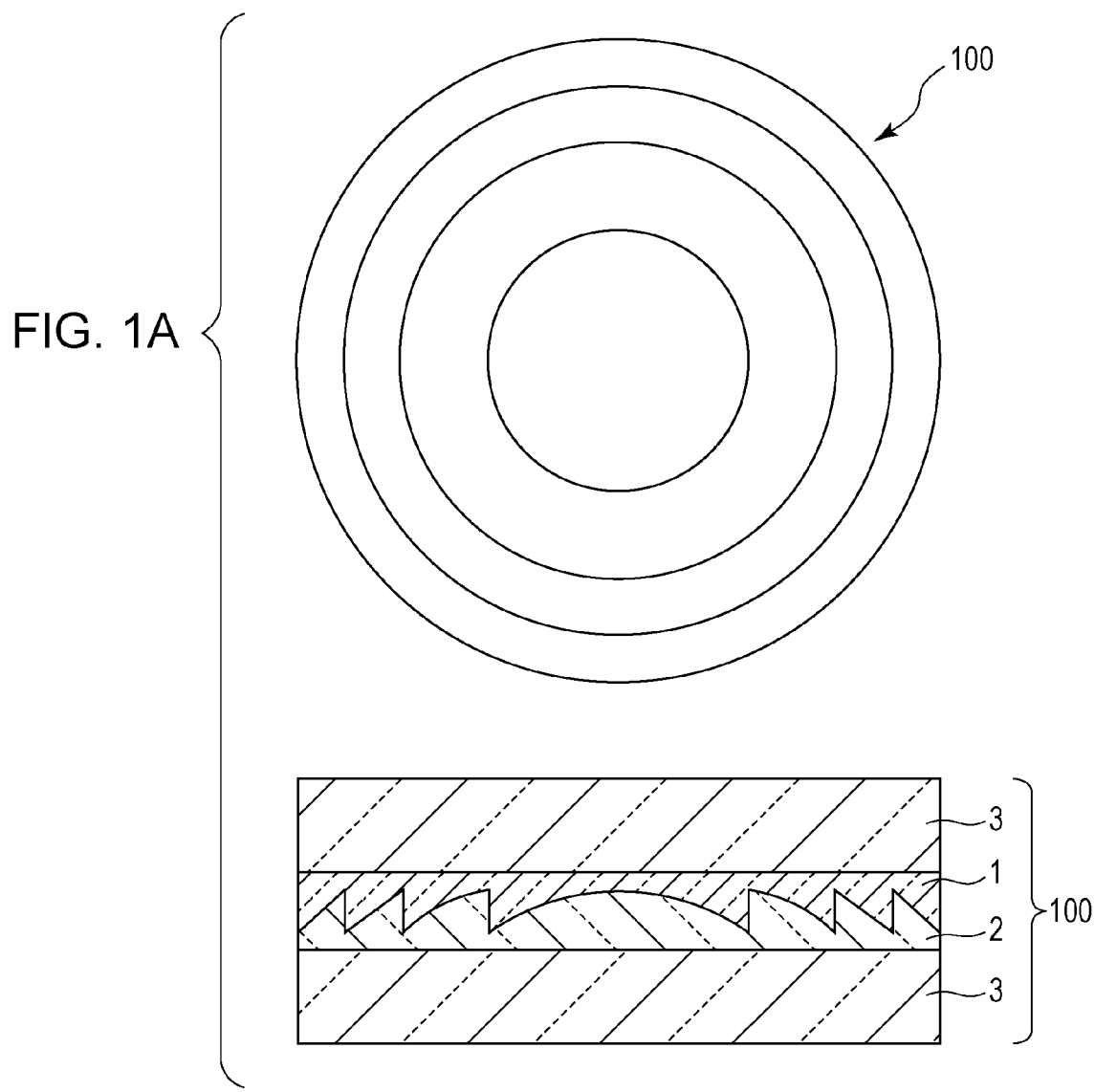
FIGS. 1A and 1B are each a schematic view of an embodiment of an optical element according to aspects of the present invention.

Hereinafter, embodiments according to aspects of the present invention will be described in detail.

First Embodiment

In a method for manufacturing an optical element according to a first embodiment, after a first material including a precursor of a first energy curable resin which contains fine particles of a transparent conductive material is provided on a transparent substrate and is then cured by light irradiation, a heat treatment is performed, and furthermore, the cured first material processed by the heat treatment is again processed by light irradiation (hereinafter referred to as "post light irradiation" in some cases). An optical element obtained by the manufacturing method according to aspects of the present invention which uses a material containing a transparent conductive material dispersed therein can suppress the change in the refractive index/transmission at a long wavelength caused by light, such as ultraviolet light.

In addition, the method for manufacturing an optical element according to the first embodiment includes the following two methods for manufacturing a multilayer diffractive optical element.

(1) In a method for manufacturing an optical element comprising: providing on a transparent substrate a first material including a precursor of a first energy curable resin which contains fine particles of a transparent conductive material; curing the first material by light irradiation; providing a second material including a precursor of a second energy curable resin on the cured first material; curing the second material by light irradiation, and performing a heat treatment on the cured first and second materials, the method for manufacturing an optical element further comprises again performing light irradiation (post light irradiation) on the cured first and the second materials which are processed by the heat treatment.

(2) In a method for manufacturing an optical element comprising: providing on a transparent substrate a second material including a precursor of a second energy curable resin; curing the second material by light irradiation; providing a first material including a precursor of a first energy curable resin which contains fine particles of a transparent conductive material on the cured second material; curing the first material by light irradiation; and performing a heat treatment on the cured first and second materials, the method for manufacturing an optical element further comprises again performing light irradiation (post light irradiation) on the cured first and the second materials which are processed by the heat treatment.

In the multilayer diffractive optical element obtained by the manufacturing method of this embodiment, a multilayer using the material in which the fine particles of the transparent conductive material are dispersed can suppress the change in the refractive index/transmission at a long wavelength caused by light, such as ultraviolet light. In the multilayer diffractive optical element described above, the optical properties of the cured first material are preferably relatively low refractive index and high dispersion, and the optical properties of the cured second material are preferably relatively high refractive index and low dispersion.

The present inventors discovered that by a photochemical reaction of a resin caused by ultraviolet light and visible light having a short wavelength, each of which is incident on an optical element in general use environment, a dispersion material containing fine particles of a transparent conductive material, such as ITO, generates radicals. The generated radicals are trapped by the fine particles of the transparent conductive material to function as carriers thereof. Hence, the optical properties are influenced thereby. In particular, the present inventors discovered that the refractive index and the absorption in the visible region at a long wavelength side ($\lambda$=500 to 700 nm) are significantly changed. As a result, the present inventors found a problem in that by the change in the refractive index of the dispersion material containing fine particles of a transparent conductive material, a high diffraction efficiency state of the optical element at an initial stage is shifted from the diffraction conditions.

The present inventors discovered that when an optical element which uses a dispersion material containing fine particles of a transparent conductive material, such as ITO, is formed, some of radicals generated in energy curing by ultraviolet light or the like are trapped by the ITO fine particles to contribute to the optical properties as carriers. In addition, besides the increase in number of carriers by the increase in number of trapped radicals, it was also found that the number of carriers is increased by excitation. It was found that the carriers generated by excitation inhibit the carriers generated by the trapped radicals from reaching a saturated level. In addition, it was also found that after the carriers generated by excitation are made to disappear by performing a heat treatment (annealing) or the like, when light irradiation is again further performed in such a way that energy irradiation is performed by ultraviolet light or the like, the radicals trapped by the fine particles of the transparent conductive material reach an approximately saturated level. When such energy irradiation is performed, even if an optical element is placed in environment of ultraviolet light or the like, the change in the optical properties thereof can be suppressed.

In the method for manufacturing an optical element using a dispersion material containing fine particles of a transparent conductive material of this embodiment, after the dispersion material is formed into a final shape of the optical element by energy curing of light irradiation, a heat treatment is performed, and light irradiation is again performed (post light irradiation). Accordingly, this embodiment is able to propose a method for manufacturing an optical element which can suppress the change in the optical properties of the optical element even in environment of ultraviolet light or the like.

<Transparent Conductive Material>

In the first material according to aspects of the present invention, the fine particles of the transparent conductive material (hereinafter simply referred to as "fine particles" in some cases) are contained. In the second material, fine particles of a transparent conductive material may or may not be contained.

As preferable examples of the fine particles of the transparent conductive material contained in the precursor of the energy curable resin according to aspects of the present invention, for example, there may be mentioned zinc oxide (ZnO), indium oxide, tin oxide, antimony oxide, indium tin oxide (ITO), antimony-doped tin oxide (ATO), zinc-doped indium oxide (IZO), aluminum-doped zinc oxide (AZO), and fluorine-doped tin oxide (PTO). Among those mentioned above, indium tin oxide (ITO), antimony-doped tin oxide (ATO), and zinc oxide are preferably used. Among the currently existing materials, indium tin oxide (ITO) has a low second-order dispersion characteristic ($\theta_{gF}$) and in particular, has the highest transparency. However, when a material having a low second-order dispersion characteristic ($\theta_{gF}$) and more excellent transparency than that of indium tin oxide (ITO) is discovered in future, the use of this material is not limited.

In addition, in accordance with a solvent in which a monomer formed into a base resin of the precursor and the fine particles are dispersed in advance, various surface treatment agents and/or dispersants are preferably used on the surfaces of the fine particles.

As the average particle diameter of the fine particles of the transparent conductive material, a particle diameter that has no adverse influence on the optical transmittance, the optical scattering, and the like is preferable. The average particle diameter is 1 to 100 nm, preferably 2 to 30 nm, and more preferably 2 to 20 nm. However, for example, even if the average particle diameter is 20 nm or less, when the distribution of the particle diameter is broad, and the volume fraction of particles having a particle diameter of more than 30 nm is 5% or more of all the fine particles (including the case in which fine particles are aggregated), the optical scattering is considerably adversely affected thereby. In the case described above, by a filtering treatment using a filter having a pore size relatively smaller than the size of particles to be removed, unnecessary large fine particles are preferably removed. As the state in which the fine particles are removed, a state (fine particle dispersion liquid) in which fine particles are dispersed in a solvent before a monomer formed into a base resin is mixed, a state in which the base resin is dissolved in the fine particle dispersion liquid, or although dependent on the viscosity, a state in which the solvent is removed from the state described above to form a non-solvent mixture of the base resin and the fine particles is preferable.

The content of the fine particles of the transparent conductive material contained in the cured first material is 1 to 29 percent by volume with respect to the total of the first material and is preferably 5 to 20 percent by volume. When the content is less than 1 percent by volume, it is not preferable since the optical properties cannot be effectively obtained. In addition, when the content is more than 29 percent by volume, it is also not preferable since the moldability is degraded.

If needed, a surface treatment is preferably performed on the fine particles of the transparent conductive material. The surface treatment may be performed when the fine particle are synthesized or formed or may be performed separately after the fine particles are obtained.

In addition, in order to prevent the fine particles of the transparent conductive material from being aggregated, a surface treatment agent and/or a dispersant (surfactant) is preferably used to form a uniform dispersion state. In general, it has been known that when fine particles are dispersed in a solvent or a resin using a surface treatment agent and/or a dispersant, different dispersion states are obtained depending on the type, amount, molecular weight, polarity, affinity, and the like of the surface treatment agent and/or the dispersant to be added. As the surface treatment agent and/or the dispersant that can be used in aspects of the present invention, a pigment derivative, a resin type agent, and an activator type agent may be preferably used. In this embodiment, as the surface treatment agent and/or the dispersant, a cationic, a weak cationic, a nonionic, or an ampholytic surfactant is effectively used. In particular, a polyester-based, an $\epsilon$-caprolactone-based, a polycarboxylic acid salt, a polyphosphate salt, a hydrostearate salt, an amidosulfonate salt, a polyacrylate salt, an olefin-maleate salt copolymer, an acrylic-maleate salt copolymer, an alkylamine acetate salt, an alkyl fatty acid salt, a fatty acid poly(ethylene glycol) ester-based, a silicone-based, and a fluorine-based surfactant may be used; however, according to aspects of the present invention, at least one type of basic compounds selected from ammonium and organic amines is preferably used. In particular, for example, there may be mentioned DISPERBYK-161, 162, 163, and 164 of DISPERBYK Series (manufactured by BYK Japan KK), Solsverse 3000, 9000, 17000, 20000, 24000, and 41090 of Solsverse Series (manufactured by Zenega Co., Ltd.), and PO or EO modified products of alkylamines, such as TAMN-15, of TAMN Series (manufactured by Nikko Chemicals Co., Ltd.). The addition amount of the surface treatment agent and/or the dispersant is changed depending roughly on the type of surface treatment agent and/or dispersant, the type of fine particles, the surface area thereof (diameter of fine particles), the type of dispersion resin in which the fine particles are mixed, and the type of dispersion solvent. As the addition amount of the surface treatment agent and/or the dispersant, with respect to the weight of the fine particles, the amount is preferably in a range of 0.1 to 35.0 percent by weight. When the addition amount of the dispersant is excessive, since cloudiness occurs thereby, the optical scattering is generated, and in addition, the properties (refractive index, Abbe's number, second-order dispersion characteristic, elastic modulus, and the like) of the composition which contains the fine particle are unnecessarily degraded. The addition amount is preferably in a range of 4.0 to 25.0 percent by weight. In addition, the surface treatment agents and/or the dispersants may be used alone, or at least two types thereof may be used in combination.

<Dispersion Solvent>

As a dispersion solvent that can be used in aspects of the present invention, in order to dissolve a monomer, an oligomer, and the like, each of which is a resin composition component of the precursor of the energy curable resin, or to disperse the fine particles of the transparent conductive material in a solvent, if needed, the solvent is used to dissolve a surface treatment agent and/or a dispersant.

As the dispersion solvent, for example, there may be mentioned aromatic hydrocarbons, such as toluene, benzene, and xylene; alcohols, such as ethanol and isopropyl alcohol; alicyclic hydrocarbons such as cyclohexane; acetates, such as ethyl acetate and butyl acetate; ketones, such as acetone and methyl ethyl ketone; amides, such as dimethyl formamide (DMF), dimethyl acetamide (DMAc), and N-methylpyrrolidone (NMP); aliphatic hydrocarbons, such as hexane and octane; ethers, such as diethyl ether and butyl carbitol; and halogenated hydrocarbons, such as dichloromethane and tetrachloro carbon; however, the dispersion solvent is not limited to those mentioned above. In accordance with the affinity of the fine particles to be used and the affinity of the surface treatment agent and/or the dispersant to be used, the dispersion solvent may be appropriately selected. In addition, the dispersion solvents may be used alone, or at least two types thereof may be used in combination as long as the dispersibility is not adversely influenced.

<Precursor of Energy Curable Resin>

Next, the precursor of the energy curable resin according to aspects of the present invention will be described. The precursor of the first energy curable resin is used for the first material, and the precursor of the second energy curable resin is used for the second material. Although a resin composition (monomer and oligomer) of the precursor of the first energy curable resin may be the same as or different from a resin composition (monomer and oligomer) of the precursor of the second energy curable resin, when it is attempted to suppress the change in the properties of the first material with time by oxygen diffusion in the optical element, in order to control the oxygen permeability and the oxygen solubility of the second material, the compositions of the first and the second materials and the ratio therebetween must be adjusted.

According to aspects of the present invention, as the precursor of the energy curable resin, a monomer or an oligomer, which is a binder component as the base resin, is used. As the monomer or the oligomer, a material is preferable which is compatible with a surface treatment agent, a dispersant, and a solvent in which for example, the fine particles of the transparent conductive material are dispersed.

The monomer described above is not particularly limited, as long as being a compound having at least one unsaturated group, such as a double bond or a triple bond, in its molecule. As particular examples of a monomer or an oligomer of the compound having an unsaturated group, for example, there may be mentioned monofunctional acrylates or methacrylates, such as 1,4-divinylcyclohexane, 1,4-cyclohexane dimethanol divinyl ether, 4,4-dimethyl-hept-1-en-6-yne, divinylbenzene, 1,6-divinylnaphthalene, N-vinylpyrrolidone, N-vinylcaprolactam, ethoxylated bisphenol A divinyl ether, propoxylated bisphenol A divinyl ether, poly(ethylene glycol) mono(meth)acrylate, polypropylene glycol mono(meth)acrylate, and phenoxyethyl (meta)acrylate. In addition, the following polyfunctional acrylates or methacrylates may also be mentioned as particular examples. That is, for example, there may be mentioned poly(ethylene glycol) di(meth)acrylate, poly(propylene glycol) di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, and tri(acryloxyethyl)isocyanurate; compounds which are (meth)acrylated after ethylene oxide or propylene oxide is added to a polyalcohol, such as glycerin or trimethylolethane; urethane acrylates as disclosed in Japanese Patent Publication Nos. 48-4178 and 50-6034; polyester acrylates disclosed in Japanese Patent Laid-Open No. 48-64183 and Japanese Patent Publication Nos. 49-43191 and 52-30490; and epoxy acrylates obtained by a reaction between an epoxy resin and (meth)acrylic acid.

In the case of fluorinated monomers, as monomers forming preferable resins, a fluorinated acrylic monomer, a fluorinated methacrylic monomer, a fluorinated epoxy monomer, and a fluorinated vinyl monomer may be mentioned. In particular, as the monomers and analogs thereof, there may be mentioned 2,2,2-trifluoroethyl acrylate, 2,2,3,3,3-pentafluoropropyl acrylate, 2-(perfluorobutyl)ethyl acrylate, 3-perfluorobutyl-2-hydroxypropyl acrylate, 2-(perfluorohexyl)ethyl acrylate, 3-perfluorohexyl-2-hydroxypropyl acrylate, 2-(perfluorooctyl)ethyl acrylate, 3-perfluorooctyl-2-hydroxypropyl acrylate, 2-(perfluorodecyl)ethyl acrylate, 2-(perfluoro-3-methylbutyl)ethyl acrylate, 3-(perfluoro-3-methylbutyl)-2-hydroxypropyl acrylate, 2-(perfluoro-5-methylhexyl)ethyl acrylate, 3-(perfluoro-5-methylhexyl)-2-hydroxypropyl acrylate, 2-(perfluoro-7-methyloctyl)ethyl acrylate, 3-(perfluoro-7-methyloctyl)-2-hydroxypropyl acrylate, 1H,1H,3H-tetrafluoropropyl acrylate, 1H,1H,5H-octafluoropentyl acrylate, 1H,1H,7H-dodecafluoroheptyl acrylate, 1H,1H,9H-hexadecafluorononyl acrylate, 1H-1-(trifluoromethyl)trifluoroethyl acrylate, 1H,1H,3H-hexafluorobutyl acrylate, 2,2,3,3,4,4,5,5-octafluorohexane-1,6-diacrylate, 2,2,2-trifluoroethyl methacrylate, 2,2,3,3,3-pentafluoropropyl methacrylate, 2-(perfluorobutyl)ethyl methacrylate, 3-perfluorobutyl-2-hydroxypropyl methacrylate, 2-(perfluorohexyl)ethyl methacrylate, 3-perfluorohexyl-2-hydroxypropyl methacrylate, 2-(perfluorooctyl)ethyl methacrylate, 3-perfluorooctyl-2-hydroxypropyl methacrylate, 2-(perfluorodecyl)ethyl methacrylate, 2-(perfluoro-3-methylbutyl)ethyl methacrylate, 3-(perfluoro-3-methylbutyl)-2-hydroxypropyl methacrylate, 2-(perfluoro-5-methylhexyl)ethyl methacrylate, 3-(perfluoro-5-methylhexyl)-2-hydroxypropyl methacrylate, 2-(perfluoro-7-methyloctyl)ethyl methacrylate, 3-(perfluoro-7-methyloctyl)-2-hydroxypropyl methacrylate, 1H,1H,3H-tetrafluoropropyl methacrylate, 1H,1H,5H-octafluoropentyl methacrylate, 1H,1H,7H-dodecafluoroheptyl methacrylate, 1H,1H,9H-hexadecafluorononyl methacrylate, 1H-1-(trifluoromethyl)trifluoroethyl methacrylate, 1H,1H,3H-hexafluorobutyl methacrylate, 2,2,3,3,4,4,5,5-octafluorohexane-1,6-dimethacrylate, hexafluoroepoxypropane, 3-perfluorobutyl-1,2-epoxypropane, 3-perfluorohexyl-1,2-epoxypropane, 3-perfluorooctyl-1,2-epoxypropane, 3-perfluorodecyl-1,2-epoxypropane, 3-(perfluoro-3-methylbutyl)-1,2-epoxypropane, 3-(perfluoro-5-methylhexyl)-1,2-epoxypropane, 3-(perfluoro-7-methyloctyl)-1,2-epoxypropane, 3-(2,2,3,3-tetrafluoropropoxy)-1,2-epoxypropane, 3-(1H,1H,5H-octafluoropentyloxy)-1,2-epoxypropane, 3-(1H,1H,7H-dodecafluoroheptyloxy)-1,2-epoxypropane, 3-(1H,1H,9H-hexadecafluorononyloxy)-1,2-epoxypropane, and 1,4-bis(2', 3'-epoxypropyl)-perfluoro-n-butane.

These monomers may be used alone, or at least two types thereof may be used in combination. As a resin composition, a fluorinated polymer resin may also be selected. In addition, as a copolymer, among materials manufactured by Central Glass Co., Ltd., Nos. 702C, 703C, 704C, 705C, 706C, 707C, and analogs thereof may be mentioned.

Fluorinated monomers having a polymerizable functional group in its molecule, each of which functions as the monomer of the resin composition of the first material, may be used alone, or at least two types thereof may be used in combination. Alternatively, at least one of the fluorinated monomers may be used together with the acrylate and/or the methacrylate mentioned above.

The energy curable resin forming the first material is preferably at least one radical curable resin selected from the group consisting of an acrylic resin, a vinyl resin, and an epoxy resin.

The content of the resin composition (monomer and oligomer) of the precursor of the energy curable resin contained in the first material is 30 to 98 percent by volume with respect to the total first material and is preferably 50 to 90 percent by volume. When the content is less than 30 percent by volume, it is not preferable since the moldability is degraded. In addition, when the content is more than 98 percent by volume, since the ratio of the conductive fine particles is relatively decreased, it is not preferable since the optical properties are not sufficiently obtained.

As a method for performing energy curing of the precursor of the energy curable resin, polymerization can be performed by stimulating an initiator by a plasma treatment, a heat treatment, or energy of light such as radiation or ultraviolet light. When replica formation of a lens or the like is taken into consideration, photocuring is preferable. In particular, as usable photopolymerization initiators, for example, 2-benzyl-2-dimethylamino-1-(4-morpholinophenyl)-1-butanone, 1-hydroxy-cyclohexyl phenyl ketone, bis(2,4,6-trimethylbenzoyl)phenylphosphine oxide, 4-phenyl-benzophenon, 4-phenoxybenzophenone, 4,4'-diphenylbenzophenone, and 4,4'-diphenoxybenzophenone may be preferably mentioned. When the transparency of a cured resin is taken into consideration, 1-hydroxy-cyclohexyl phenyl ketone is preferably used.

Although the addition amount of the photopolymerization initiator is changed depending on the addition amount of the fine particles which absorb visible light, with respect to the total resin composition of the material, the amount is preferably set in a range of 0.01 to 10.00 percent by weight. In accordance with the reactivity with a monomer and an oligomer and the wavelength of light irradiation, the photopolymerization initiators may be used alone, or at least two types thereof may be used in combination.

Next, steps of preparing the first material and the second material according to aspects of the present invention will be described.

After the surface treatment agent or the dispersant in an appropriate amount is first dissolved in a selected solvent, and the fine particles are added thereto, a shearing force is applied to the mixture thus prepared to pulverize aggregates of the fine particles, and remaining aggregates are removed by centrifugal separation and a filter treatment, so that a uniform fine particle dispersion liquid is obtained. Subsequently, a photopolymerizable monomer and oligomer and a photopolymerization initiator are dissolved in the above dispersion liquid. When the monomer and the oligomer are dissolved in the fine particle dispersion liquid, the solvent, the surface treatment agent, and the dispersant are preferably used in combination so that the dispersion state of the fine particles is not degraded by the addition of the monomer and the oligomer. In addition, if needed, by performing a filtering treatment, aggregated fine particles can be removed.

After it is confirmed that the fine particles are preferably dispersed without generating any precipitations thereof, the solvent is removed using an evaporator. In this step, in accordance with the boiling point of the solvent, the amount of a remaining solvent, and the like, it is preferable that the vacuum degree be appropriately adjusted. By rapid evaporation and removal of the solvent, the degree of aggregation of the fine particles may be degraded, and as a result, the dispersibility is degraded in some cases. In addition, when the solvent is removed at a reduced pressure, if needed, heating may be performed so as not to degrade the dispersibility. As described above, the first material or the second material, which is the precursor used in aspects of the present invention, is obtained.

In the first material or the second material thus obtained, a remaining solvent which cannot be removed may be contained in some cases. When this content is more than 0.1 percent by weight, by a function to promote fine particle migration in energy curing, the gradient index (GI) and the light scattering are increased. Hence, the content of the remaining solvent is preferably 0.1 percent by weight or less. However, when the vacuum degree is excessively high, when heating is performed under a reduced pressure condition, or when a reduced-pressure step is performed for a long time, monomers, such as the surface treatment agent, the dispersant, and the binder component, which are added together with the solvent may also be distilled away in some cases. Hence, in consideration of the molecular weight, the boiling point, the sublimability, and the like of each monomer, the vacuum degree, the temperature, the process time, and the like must be adjusted.

<Curing by Light Irradiation, Heat Treatment, and Post Light Irradiation>

First, a method for curing the first material and the second material, which are the precursors of the resins, by light irradiation will be described.

When the optical element according to aspects of the present invention is molded, and as a particular example, when a diffractive optical element is molded, a process of forming a mold forming layer using the first material of the precursor by a photopolymerization method will be described. When a thin layer structure is formed on a light transmissive material to be used for the transparent substrate, for example, a flat glass plate is used as the substrate, and a metal material is used for a mold having a shape corresponding to a fine diffraction grating structure. After the first material formed of the precursor having fluidity is pored between the mold and the flat glass plate, the mold and the glass plate are lightly pressed to each other, so that mold formation is performed. While the state described above is maintained, photopolymerization of the first material is performed.

Light irradiation for such a photopolymerization reaction is performed using light, such as in general ultraviolet light or visible light, having a preferable wavelength in accordance with the mechanism based on radical generation using a photopolymerization initiator. For example, light irradiation is uniformly performed on the molded first material of the precursor through the light transmissive material, that is, the flat glass plate, used for the substrate. The amount of light to be irradiated is appropriately selected in accordance with the mechanism based on the radical generation using a photopolymerization initiator and the content thereof. Subsequently, the second material of the precursor is laminated. When it is intended to form a highly efficient diffractive optical element in the whole visible region, the second material to be laminated is determined by the optical constants of the first layer formed of the first material so as to have high refractive index and low dispersion values after the curing as compared to those of the first layer. As the second material, a monomer of the resin or a mixture containing a monomer and fine particles of zirconia, alumina, or the like may be used.

However, when a property of inhibiting oxygen diffusion and/or a function to absorb oxygen is imparted to the second material, the composition of the monomer thereof, and the surface treatment agent and/or the dispersant for the fine particles of zirconia and alumina are limited. In particular, a general dispersant having a high molecular weight cannot be used, and for example, a surface treatment agent having a low molecular weight and forming a strong covalent bond with the monomer is preferable. The reason for this is that the glass transition temperature of the second material is increased to inhibit the diffusion of oxygen. After the second material of the precursor is arranged on the transparent substrate, and the polymer molded body (diffraction grating or the like) of the first material is lightly pressed on the second material, while the state as described above is maintained, photopolymerization of the second material is performed. Light irradiation for such a photopolymerization reaction is performed using light, such as in general ultraviolet light or visible light, having a preferable wavelength in accordance with the mechanism based on the radical generation using a photopolymerization initiator. For example, light irradiation is uniformly performed on the molded second material of the precursor from a side of a light transmissive material used as the transparent substrate, that is, from a transparent substrate side of the first material or a transparent substrate side of the second material. The amount of light to be irradiated is appropriately selected in accordance with the mechanism based on the radical generation using a photopolymerization initiator and the content thereof. When the second material is cured by the above method, an optical element shown in FIG. 1A or 1B is obtained.

Figure 1B:
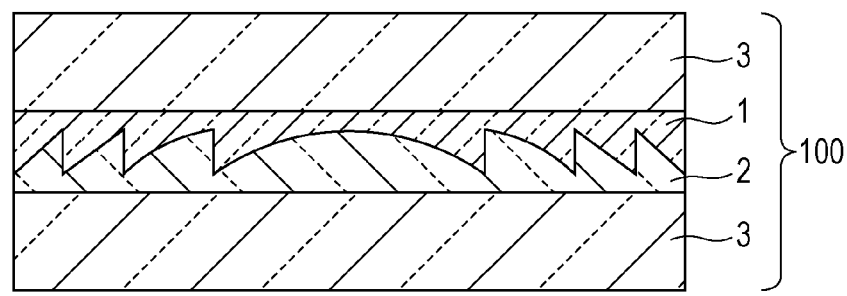
Figure 1B:
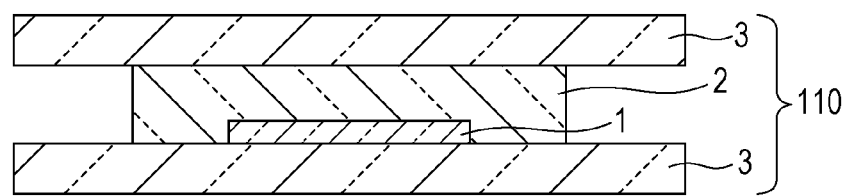

In the above description, although the optical element is formed by curing the second material of the precursor on the cured first material, conversely, the optical element shown in FIG. 1A or 1B may be formed by curing the first material of the precursor on the cured second material.

In the figure, reference numeral 1 indicates a relatively high refractive index and low dispersion layer of the cured second material, reference numeral 2 indicates a relatively low refractive index and high dispersion layer of the cured first material, and reference numeral 3 indicates a transparent substrate layer. FIG. 1A and FIG. 1B show a multilayer diffractive optical element 100 and an optical element 110, respectively.

Next, a heat treatment performed after the first material and the second material of the precursors are cured by light irradiation will be described.

In general, since the cured products obtained by curing the first and the second materials shown in FIGS. 1A and 1B each have a stress generated in the curing, the residual stress is reduced by a heat treatment. The heat treatment is performed in particular at 60° C. to 120° C. for 24 to 120 hours. The temperature is preferably 70° C. to 90° C.

Next, the post light irradiation performed after the heat treatment will be described.

After the above heat treatment is performed, since the post light irradiation is performed, an optical element having a small change in the optical properties caused by ultraviolet light, short-wavelength visible light, and the like can be formed.

The post light irradiation preferably includes light having a wavelength of 300 to 400 nm, and the amount of irradiation light having a wavelength of 300 to 400 nm is preferably 12 to 150 J.

In addition, it is preferable that the post light irradiation include light having a wavelength of 300 to 400 nm, the ratio of light having a wavelength of 300 to 350 nm be 0% to 10% of the whole light, and the amount of irradiation light having a wavelength of 300 to 400 nm be 12 to 150 J. Accordingly, an optical element having a small change in the optical properties caused by ultraviolet light, short-wavelength visible light, and the like can be formed.

By using an optical element formed by the manufacturing method according to aspects of the present invention, there can be provided a method for manufacturing a diffractive optical element in which layers formed of materials having different refractive indices and wavelength dispersions are laminated on a substrate so as to increase the diffraction efficiency of a specific order (designed order) in the entire use wavelength region and to prevent the change in the properties caused by visible light or ultraviolet light and the change with time caused by oxygen diffusion from a peripheral portion.

According to the method for manufacturing an optical element according to aspects of the present invention, since layers formed of materials having different refractive indices and wavelength dispersions are laminated on a substrate, the diffraction efficiency of a specific order (designed order) can be increased in the entire use wavelength region, and an optical element can be provided which prevents properties thereof from being changed by visible light or ultraviolet light and moisture absorption. Accordingly, the present invention can be used for an optical element, a diffractive optical element, a multilayer diffractive optical element, and an optical system, in particular, an image forming optical system, such as a camera and a video camera.

Second Embodiment

Figure 10:
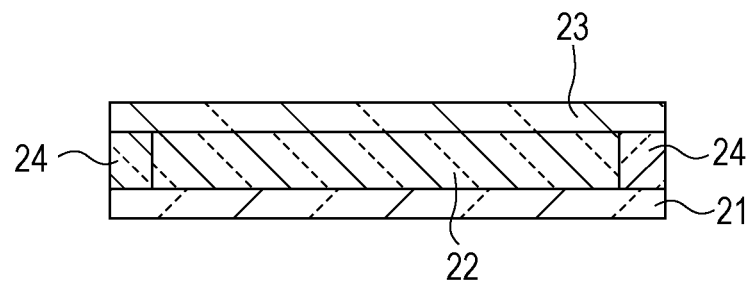
FIG. 10 is a schematic view of one example of an optical element of a second embodiment according to aspects of the present invention.

An optical element according to a second embodiment is an optical element having a first member containing fine particles of a transparent conductive material and a second transparent substrate in this order on a first transparent substrate, and the first member is provided with a layer which inhibits permeation of oxygen at a portion in contact with the air and which has an oxygen permeability of $2.0 \times 10^{-11}$ P/cm$^3$·cm·(cm$^2$·s·cmHg)$^{-1}$ or less measured by a high-vacuum pressure difference method. With reference to FIG. 10, the optical element of the second embodiment will be described. In FIG. 10, a first member 22 containing fine particles of a transparent conductive material and a second transparent member 23 are provided on a first transparent member 21. The first member 22 containing fine particles of a transparent conductive material is provided with a layer 24 which inhibits permeation of oxygen so as not to be in contact with the air.

The optical element of the second embodiment using a material in which the transparent conductive material is dispersed can suppress the change with time in the refractive index/transmittance at a long wavelength which is caused by oxidation of the transparent conductive material.

The present inventors discovered that the refractive index and the absorption at a long wavelength side ($\lambda$=500 to 700 nm) in the visible region of an optical material using fine particles of a transparent conductive material, such as ITO, are considerably changed from the periphery of an element, and these changes progress to the inside with time. By this change in the refractive index, the optical properties are shifted from the diffraction condition, and the element performance is degraded. In particular, the present inventors found that the element performance of an element manufactured by a manufacturing method which performs light irradiation at least twice is more considerably degraded.

It is believed that when an optical element using a dispersion material containing fine particles of a transparent conductive material, such as ITO, is formed, some of radicals generated in energy curing by ultraviolet light or the like and radicals generated by energy of ultraviolet light or the like after the curing are trapped by the fine particles of the transparent conductive material, such as ITO, and the trapped radicals have contribution to the optical properties of the dispersion material containing fine particles of a transparent conductive material. In addition, the present inventors also believe that an optical material in which radicals are trapped by the fine particles of the transparent conductive material, such as ITO, as described above loses the radicals adhered to ITO by diffusion of oxygen from the periphery of the element, and hence the fine particles of ITO are returned to the original state. Accordingly, it is believed that the number of carriers in the transparent conductive material is changed, and as a result, the optical properties are influenced.

The present inventors discovered that when a layer which inhibits the diffusion of oxygen is provided at a peripheral portion of an optical element in contact with the air, the refractive index and the absorption of an optical material using fine particles of a transparent conductive material, such as ITO, at a long wavelength side ($\lambda$=500 to 700 nm) in the visible region are suppressed from being considerably changed, and these changes progressing to the inside with time can also be suppressed. In addition, the solubility of oxygen in the second material is preferably equal to or more than ($1.4 \times 10^{-3}$ (cm$^3$·cmHg)$^{-1}$) that of the first material. The thickness of the second material is preferably 1.5 times the average thickness of the first material. In addition, the oxygen permeability of the second material is preferably set to $2.0 \times 10^{-11}$ P/cm$^3$·cm·(cm$^2$·s·cmHg)$^{-1}$ or less measured by a high-vacuum pressure difference method.

Among optical elements using a dispersion material containing fine particles of a transparent conductive material, the second embodiment relates to an optical element which can suppress the change of properties of the element with time in common environment by a layer to inhibit the diffusion of oxygen provided at a peripheral portion.

Figure 11A:
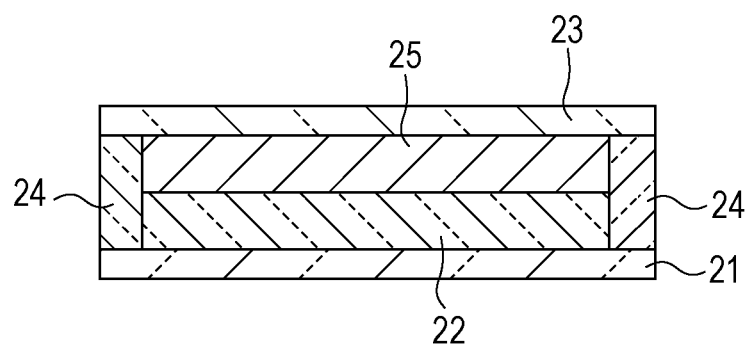
FIGS. 11A and 11B are each a schematic view of one example of the optical element of the second embodiment according to aspects of the present invention.
Figure 11B:
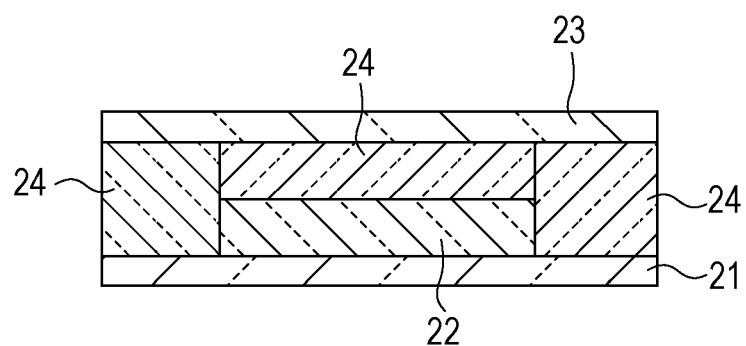

The optical element of the second embodiment may have a first member containing fine particles of a transparent conductive material, a second member, and a second transparent substrate in this order on a first transparent substrate. In addition, the second member may be formed of the same material as that of the layer which inhibits permeation of oxygen. The optical element will be described with reference to FIGS. 11A and 11B. In FIG. 11A, the first member 22 containing fine particles of a transparent conductive material, a second member 25, and the second transparent member 23 are provided in this order on the first transparent member 21. The first member 22 containing fine particles of a transparent conductive material is provided with the layer 24 which inhibits permeation of oxygen at a portion in contact with the air so as not to be in contact with the air. As shown in FIG. 11B, the layer which inhibits permeation of oxygen may be formed of the same material as that of the second member. In FIG. 11B, although the layer 24 which inhibits permeation of oxygen and the second member are separately provided, the layer 24 and the second member may be integrally formed.

The solubility of oxygen in the second member is preferably $1.4 \times 10^{-3}$ S/cm$^3$·(cm$^3$·cmHg)$^{-1}$ or more. When the solubility of oxygen is less than $1.4 \times 10^{-3}$ (cm$^3$·cmHg)$^{-1}$, the element performance is degraded. In addition, the oxygen permeability of the second material is preferably $2.0 \times 10^{-11}$ P/cm$^3$·cm·(cm$^2$·s·cmHg)$^{-1}$ or less measured by a high-vacuum pressure difference method.

<Transparent Conductive Material>

As the transparent conductive material, the material described in the first embodiment may be used.

The content of the fine particles of the transparent conductive material in the first member is preferably 1 to 29 percent by volume to the first member.

<First Member>

The first member preferably contains at least one of an acrylic resin, a vinyl resin, and an epoxy resin.

<Optical Element>

In the optical element of the second member, when the refractive index of the first member is represented by nd1, the Abbe's number of the first member is represented by v1, the refractive index of the second member is represented by nd2, and the Abbe's number of the second member is represented by v2, nd1<nd2 and v1<v2 are preferably satisfied.

The optical element is preferably a multilayer diffractive optical element.

<Method for Manufacturing Optical Element>

A method for manufacturing an optical element of the second embodiment can be performed in a manner similar to that of the method for manufacturing an optical element of the first embodiment. Incidentally, in the method for manufacturing an optical element of the second embodiment, the post light irradiation is not always required. However, the post light irradiation is preferably performed.

In addition, in the optical element of the second embodiment, the materials described in the first embodiment may also be used.

EXAMPLES

Hereinafter, preparation of optical materials according to aspects of the present invention will be described in detail.

[Preparation of Low Refractive Index and High Dispersion Material]

[Preparation of Low Refractive Index and High Dispersion Material 11]

First, 51.63 g of a fine-particle dispersion liquid (average particle diameter: 20 nm, concentration of indium tin oxide: 9.96 percent by weight, concentration of a dispersant: 2.19 percent by weight, type of dispersant: high molecular weight dispersant, manufactured by CIK Nano Tech Corporation) in which indium tin oxide (ITO) was dispersed in a xylene solvent was mixed with 3.72 g of a mixture as an ultraviolet curable acrylic resin containing 20 percent by weight of tris(2-acryloxyethyl)isocyanurate, 25 percent by weight of pentaerythritol triacrylate, 40 percent by weight of dicyclopentenyl oxyethyl methacrylate, 13 percent by weight of a urethane modified polyester acrylate, and 2 percent by weight of 1-hydroxycyclohexyl phenyl ketone. This mixed solution was received in an evaporator, and the xylene solvent was removed finally at an oil bath temperature of 45° C. and a set pressure of 2 hPas for 20 hours, so that a low refractive index and high dispersion material 11 was prepared.

In addition, the particle diameter of the indium tin oxide (ITO) was measured by a laser type particle size analyzer (ELS, manufactured by Otsuka Electronics Co., Ltd.).

In addition, by a thermal gravity analyzer TGA (manufactured by PerkinElmer), the low refractive index and high dispersion material 11 was fired, and the inorganic solid component thereof was quantitatively determined, so that a content of 51.2 percent by weight was obtained.

The content of a remaining solvent (xylene) measured by a gas chromatography (5890 series II, manufactured by Hewlett Packard) was 0.010 percent by weight.

[Preparation of High Refractive Index and Low Dispersion Material 21]

First, 163.3 g of a fine-particle dispersion liquid (average particle diameter: 10 nm, concentration of zirconium oxide: 10.02 percent by weight, concentration of a surface treatment agent: 2.72 percent by weight, type of surface treatment agent: silane coupling agent including a low molecular weight polymerizable group, manufactured by Sumitomo Osaka Cement Company, Limited) in which zirconium oxide was dispersed in a toluene solvent was mixed with 9.20 g of a mixture as an ultraviolet curable acrylic resin containing 20 percent by weight of tris(2-acryloxyethyl)isocyanurate, 25 percent by weight of pentaerythritol triacrylate, 40 percent by weight of dicyclopentenyl oxyethyl methacrylate, 13 percent by weight of a urethane modified polyester acrylate, and 2 percent by weight of 1-hydroxycyclohexyl phenyl ketone. This mixed solution was received in an evaporator, and the toluene solvent was removed finally at an oil bath temperature of 45° C. and a set pressure of 3 hPas for 15 hours, so that a high refractive index and low dispersion material 21 was prepared.

In addition, the particle diameter of the zirconium oxide was measured by a laser type particle size analyzer (ELS, manufactured by Otsuka Electronics Co., Ltd.). Although the value submitted by Sumitomo Osaka Cement Co., Ltd. was 3 to 5 nm, since the laser type particle size distribution was obtained by measuring particle diameters including that of a surface treatment agent, it was estimated the data obtained thereby was different from the actual value.

In addition, by a TGA (manufactured by PerkinElmer), the high refractive index and low dispersion material 21 was fired, and the inorganic solid component thereof was quantitatively determined, so that a content of 54.5 percent by weight was obtained.

The content of a remaining solvent (toluene) measured by a gas chromatography (5890 series II, manufactured by Hewlett Packard) was 0.005 percent by weight or less.

Example 1

<Formation of Optical Element 200 for Refractive Index Measurement>

An optical element 200 for refractive index measurement was formed as described below.

Figure 2A:
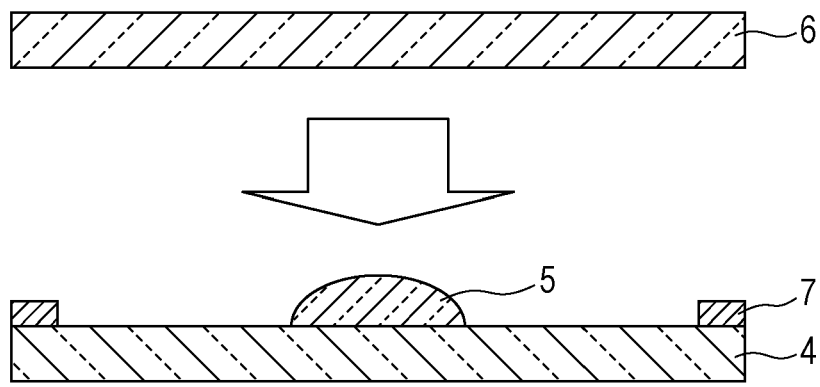
FIGS. 2A and 2B are each a schematic view showing a method for forming an optical element for refractive index measurement according to aspects of the present invention.

First, as shown in FIG. 2A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that a measurement sample was cured. After the curing was performed, a heat treatment was performed at 80° C. for 72 hours.

Figure 3A:
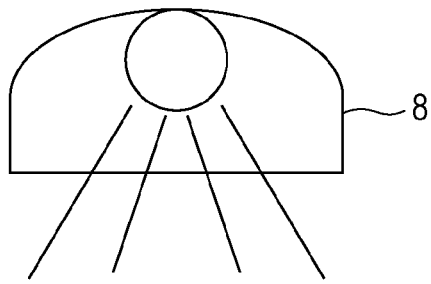
FIGS. 3A and 3B are each a schematic view of a post light irradiation step of the optical element for refractive index measurement according to aspects of the present invention.
Figure 3A:
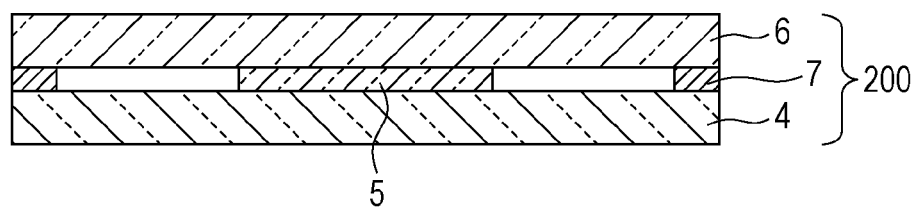

Subsequently, as the post light irradiation from a quartz glass 6 side, light irradiation was performed using a high pressure mercury lamp 8 (UL750, manufactured by Hoya Candeo Optronics Corp.) as shown in FIG. 3A through the quartz glass 6 by adjusting the illuminance so that the energy at a wavelength of 300 to 400 nm was 100 J (40 mW, 2,500 seconds).

Figure 4A:
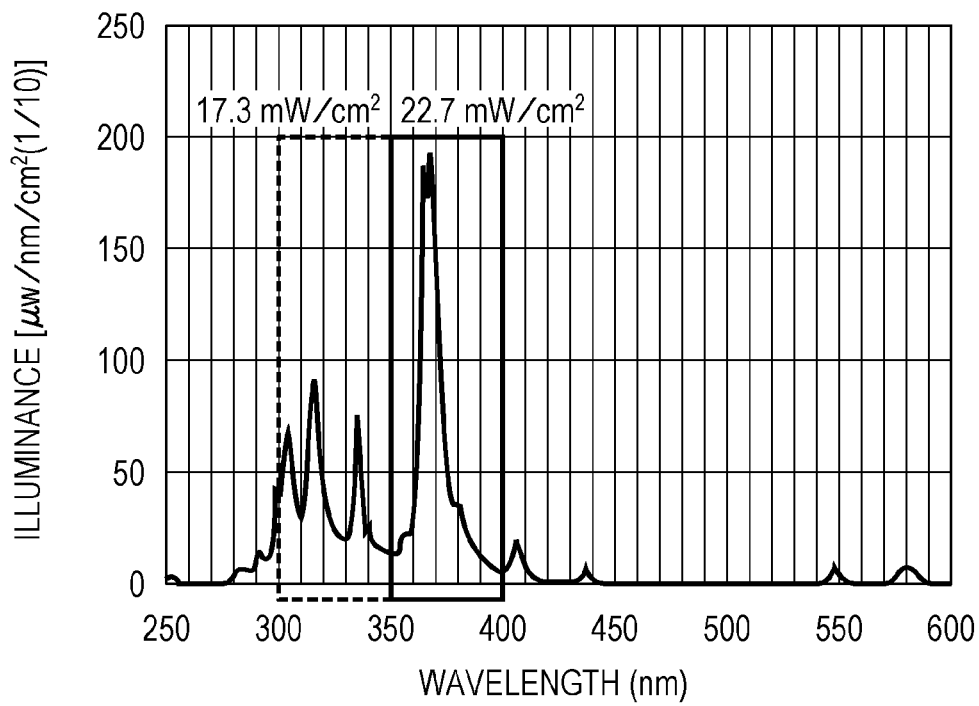
FIG. 4A is a graph showing a spectrum of a high-pressure mercury lamp for an optical element of an example according to aspects of the present invention obtained through a quartz glass.

The illuminance was determined by measuring light of the high pressure mercury lamp (UL750, manufactured by Hoya Candeo Optronics Corp.) in a range of 250 to 700 nm at 1 nm intervals through the quartz glass 6 by a spectral radiometer (USR-45D-13, manufactured by Ushio Inc.). The data is shown in FIG. 4A.

An accumulated value in a range of 300 to 350 nm was 17.3 mW, an accumulated value in a range of 350 to 400 nm was 22.7 mW, and the total was 40 mW.

The ratio of the accumulated value in a range of 300 to 350 nm to the total accumulated value in a range of 300 to 400 nm was 43.4%.

Figure 2B:
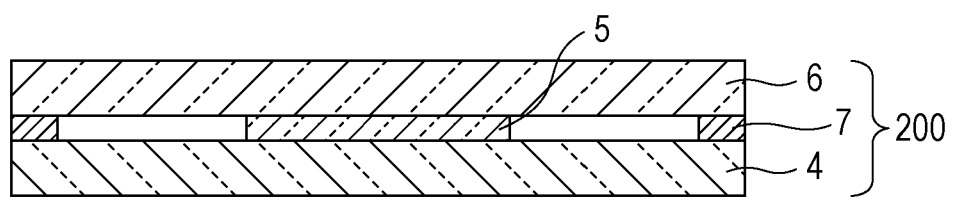

Accordingly, the optical element 200 for refractive index measurement was obtained. In FIG. 2B, the optical element 200 for refractive index measurement is shown.

Example 2

<Formation of Optical Element 210 for Refractive Index Measurement>

An optical element 210 for refractive index measurement was formed as described below.

Preceding steps before the post light irradiation were the same as those of the optical element 200 for refractive index measurement.

Figure 3B:
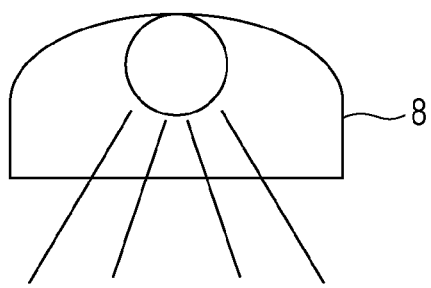
Figure 3B:
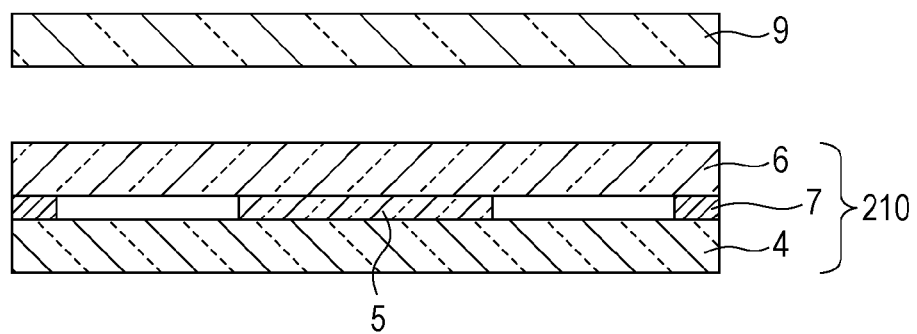

After annealing was performed at 80° C. for 72 hours, as the post light irradiation from a quartz glass 6 side, light irradiation was performed using a high pressure mercury lamp (UL750, manufactured by Hoya Candeo Optronics Corp.) as shown in FIG. 3B through a S-TIH11 glass substrate 9 by adjusting the illuminance so that the energy at a wavelength of 300 to 400 nm was 100 J (13.2 mW, 7,576 seconds).

Figure 4B:
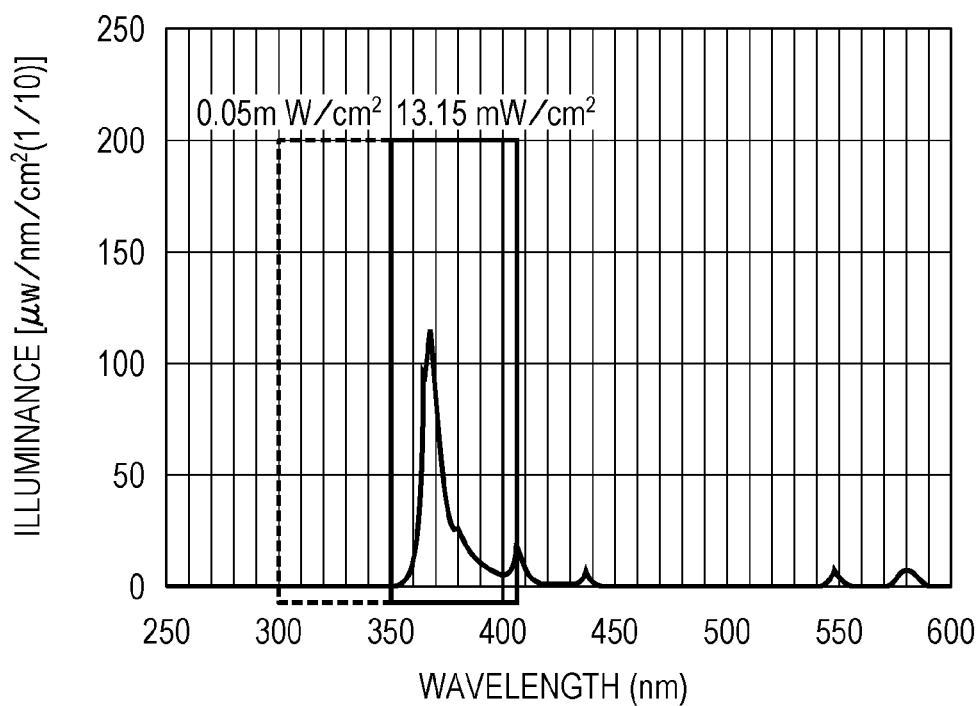
FIG. 4B is a graph showing a spectrum of a high-pressure mercury lamp for an optical element of an example according to aspects of the present invention obtained through an S-TIH11 glass substrate.

The illuminance was determined by measuring light of the high pressure mercury lamp (UL750, manufactured by Hoya Candeo Optronics Corp.) in a range of 250 to 700 nm at 1 nm intervals through the S-TIH11 glass substrate 9 by a spectral radiometer (USR-45D-13, manufactured by Ushio Inc.). The data is shown in FIG. 4B.

An accumulated value in a range of 300 to 350 nm was 0.05 mW, an accumulated value in a range of 350 to 400 nm was 13.15 mW, and the total was 13.2 mW.

The ratio of the accumulated value in a range of 300 to 350 nm to the total accumulated value in a range of 300 to 400 nm was 0.4%.

Accordingly, the optical element 210 for refractive index measurement was obtained. In FIG. 2B, the optical element 210 for refractive index measurement is shown (the structure is the same as that of the optical element 200 for refractive index measurement).

Example 3

<Formation of Optical Element 300 for Refractive Index Measurement>

An optical element 300 for refractive index measurement was formed as described below.

Figure 5A:
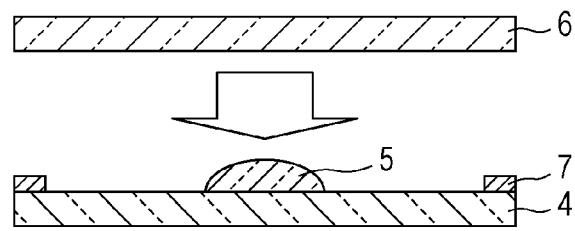
FIGS. 5A to 5E are each a schematic view of a method for forming an optical element for refractive index measurement according to aspects of the present invention.
Figure 5B:
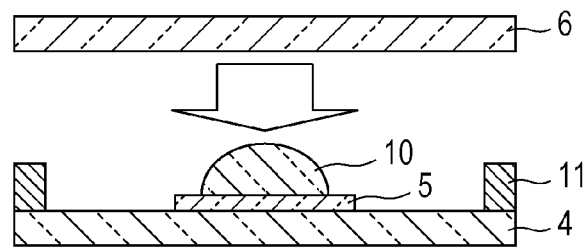
Figure 5C:
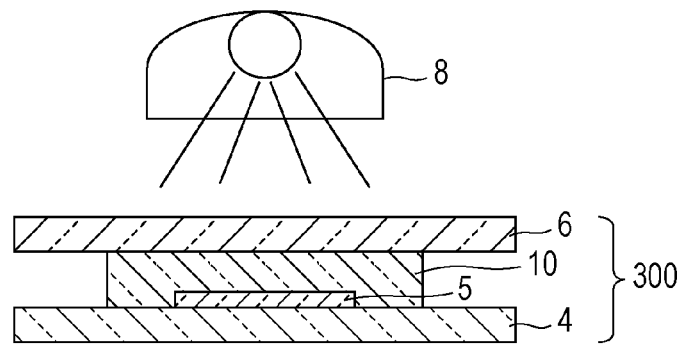

First, as shown in FIG. 5A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that the ITO fine-particle dispersion material 5 was cured. After the curing was performed, the quartz glass 6 was peeled away, and annealing was performed at 80° C. for 72 hours. Subsequently, a spacer 11 having a thickness of 50 μm and a high refractive index material 10 (high refractive index and low dispersion material 21) were arranged as shown in FIG. 5B, and the quartz glass 6 having a thickness of 1 mm was provided on the structure thus formed with the spacer 11 interposed therebetween to extend the high refractive index material 10 by pressure application. As a result, as shown in FIG. 5E, the structure was formed in which an oxygen block layer of the high refractive index material 10 having a length of 300 μm from an air interface to the ITO fine-particle dispersion material 5 and an oxygen absorption layer of the high refractive index material 10 on the ITO fine-particle dispersion material 5 were provided. Next, the structure as described above was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that the high refractive index material 10 was cured. After the curing was performed, annealing was performed at 80° C. for 72 hours. Next, as shown in FIG. 5C, as the post light irradiation from a quartz glass 6 side, light irradiation was performed using a high pressure mercury lamp 8 (UL750, manufactured by Hoya Candeo Optronics Corp.) through the quartz glass 6 by adjusting the illuminance so that the energy at a wavelength of 300 to 400 nm was 100 J (40 mW, 2,500 seconds).

The illuminance was determined by measuring light of the high pressure mercury lamp (UL750, manufactured by Hoya Candeo Optronics Corp.) in a range of 250 to 700 nm at 1 nm intervals through the quartz glass 6 by a spectral radiometer (USR-45D-13, manufactured by Ushio Inc.). The data is shown in FIG. 4A.

An accumulated value in a range of 300 to 350 nm was 17.3 mW, an accumulated value in a range of 350 to 400 nm was 22.7 mW, and the total was 40 mW.

Accordingly, the optical element 300 for refractive index measurement was obtained. In FIG. 5E, the structure of the optical element 300 for refractive index measurement is shown.

Example 4

<Formation of Optical Element 310 for Refractive Index Measurement>

An optical element 310 for refractive index measurement was formed as described below.

Preceding steps before the post light irradiation were the same as those of the optical element 300 for refractive index measurement.

After annealing was performed at 80° C. for 72 hours, as shown in FIG. 5C, as the post light irradiation from a quartz glass 6 side, light irradiation was performed using a high pressure mercury lamp 8 (UL750, manufactured by Hoya Candeo Optronics Corp.) through the quartz glass 6 by adjusting the illuminance so that the energy at a wavelength of 300 to 400 nm was 50 J (40 mW, 1,250 seconds).

The illuminance was determined by measuring light of the high pressure mercury lamp 8 (UL750, manufactured by Hoya Candeo Optronics Corp.) in a range of 250 to 700 nm at 1 nm intervals through the quartz glass 6 by a spectral radiometer (USR-45D-13, manufactured by Ushio Inc.). The data is shown in FIG. 4A.

An accumulated value in a range of 300 to 350 nm was 17.3 mW, an accumulated value in a range of 350 to 400 nm was 22.7 mW, and the total was 40 mW.

The ratio of the accumulated value in a range of 300 to 350 nm to the total accumulated value in a range of 300 to 400 nm was 43.4%.

Accordingly, the optical element 310 for refractive index measurement was obtained. In FIG. 5E, the structure of the optical element 310 for refractive index measurement is shown (the structure is the same as that of the optical element 300 for refractive index measurement).

Example 5

<Formation of Optical Element 320 for Refractive Index Measurement>

An optical element 320 for refractive index measurement was formed as described below.

Preceding steps before the post light irradiation were the same as those of the optical element 300 for refractive index measurement.

After annealing was performed at 80° C. for 72 hours, as the post light irradiation from a quartz glass 6 side, light irradiation was performed using a high pressure mercury lamp 8 (UL750, manufactured by Hoya Candeo Optronics Corp.) through a S-TIH11 glass substrate 9 as shown in FIG.

5D by adjusting the illuminance so that the energy at a wavelength of 300 to 400 nm was 100 J (13.2 mW, 7,576 seconds).

The illuminance was determined by measuring light of the high pressure mercury lamp 8 (UL750, manufactured by Hoya Candeo Optronics Corp.) in a range of 250 to 700 nm at 1 nm intervals through the S-TIH11 glass substrate 9 by a spectral radiometer (USR-45D-13, manufactured by Ushio Inc.). The data is shown in FIG. 4B.

An accumulated value in a range of 300 to 350 nm was 0.05 mW, an accumulated value in a range of 350 to 400 nm was 13.15 mW, and the total was 13.2 mW.

The ratio of the accumulated value in a range of 300 to 350 nm to the total accumulated value in a range of 300 to 400 nm was 0.4%.

Accordingly, the optical element 320 for refractive index measurement was obtained. In FIG. 5E, the structure of the optical element 320 for refractive index measurement is shown (the structure is the same as that of the optical element 300 for refractive index measurement).

Example 6

<Formation of Optical Element 330 for Refractive Index Measurement>

An optical element 330 for refractive index measurement was formed as described below.

Preceding steps before the post light irradiation were the same as those of the optical element 300 for refractive index measurement.

Figure 5D:
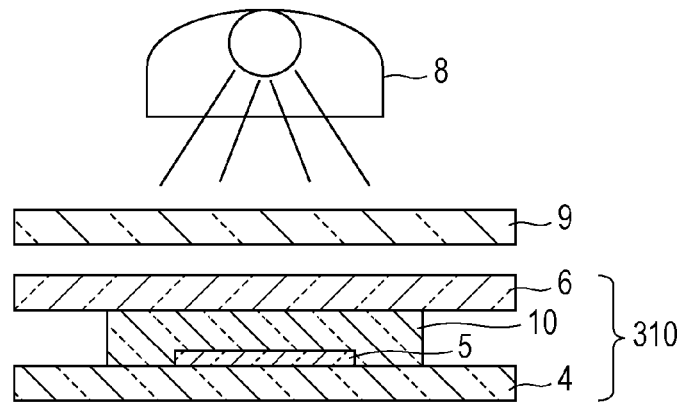
Figure 5E:
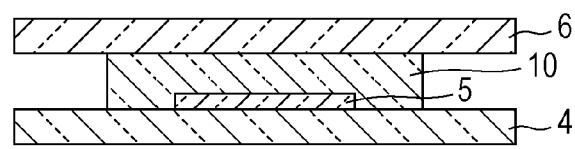

After annealing was performed at 80° C. for 72 hours, as the post light irradiation from a quartz glass 6 side, light irradiation was performed using a high pressure mercury lamp 8 (UL750, manufactured by Hoya Candeo Optronics Corp.) through a S-TIH11 glass substrate 9 as shown in FIG. 5D by adjusting the illuminance so that the energy at a wavelength of 300 to 400 nm was 50 J (13.2 mW, 3,788 seconds).

The illuminance was determined by measuring light of the high pressure mercury lamp 8 (UL750, manufactured by Hoya Candeo Optronics Corp.) in a range of 250 to 700 nm at 1 nm intervals through the S-TIH11 glass substrate 9 by a spectral radiometer (USR-45D-13, manufactured by Ushio Inc.). The data is shown in FIG. 4B. FIG. 4B is a spectrum of the high pressure mercury lamp for the optical element of the example according to aspects of the present invention through the S-TIH11 glass substrate.

An accumulated value in a range of 300 to 350 nm was 0.05 mW, an accumulated value in a range of 350 to 400 nm was 13.15 mW, and the total was 13.2 mW.

The ratio of the accumulated value in a range of 300 to 350 nm to the total accumulated value in a range of 300 to 400 nm was 0.4%.

Accordingly, the optical element 330 for refractive index measurement was obtained. In FIG. 5E, the structure of the optical element 330 for refractive index measurement is shown (the structure is the same as that of the optical element 300 for refractive index measurement).

Example 10

<Formation of Optical Element 500 for Refractive Index Measurement>

An optical element 500 for refractive index measurement was formed as described below.

Figure 9A:
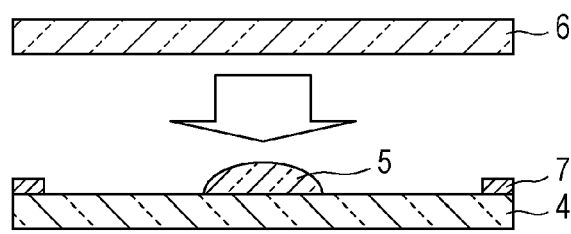
FIGS. 9A to 9E are each a schematic view of a method for forming a multilayer diffractive optical element according to Example 10.
Figure 9B:
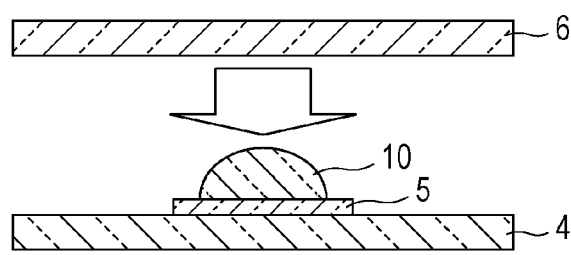
Figure 9C:
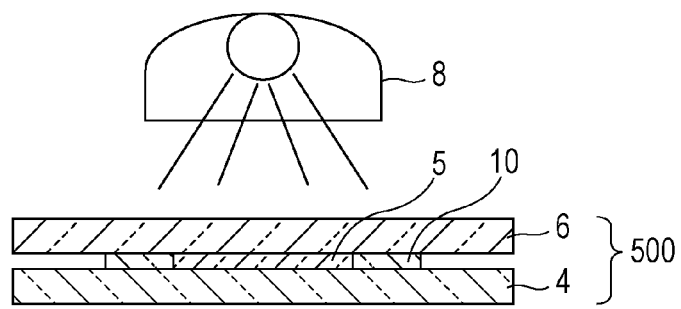
Figure 9D:
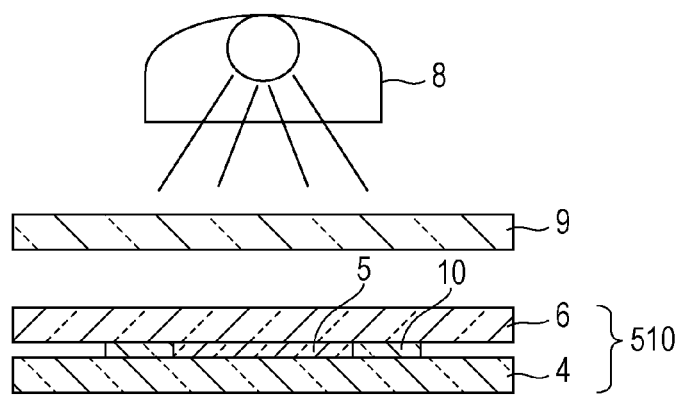
Figure 9E:
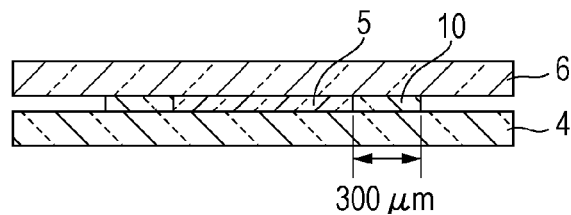

First, as shown in FIG. 9A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm² (illuminance through the quartz glass, illuminance meter: UIT-250, light receiving portion: UVD-S365) for 1,300 seconds (26 J), so that the ITO fine-particle dispersion material 5 was cured. After the curing was performed, the quartz glass 6 was peeled away, and annealing was performed at 80° C. for 72 hours. Subsequently, a high refractive index material 10 (high refractive index and low dispersion material 21) was arranged as shown in FIG. 9B, and the quartz glass 6 having a thickness of 1 mm was provided on the structure formed as described above to extend the high refractive index material 10 by pressure application. As a result, as shown in FIG. 9E, the structure was formed in which an oxygen block layer of the high refractive index material 10 having a length of 300 μm from an air interface to the ITO fine-particle dispersion material 5 was provided. Next, the structure as described above was irradiated by a high pressure mercury lamp (UL750, manufactured by Hoya Candeo Optronics Corp.) at 20 mW/cm² (illuminance through the quartz glass, illuminance meter: UIT-250, light receiving portion: UVD-S365) for 1,300 seconds (26 J), so that the high refractive index material 10 was cured. After the curing was performed, annealing was performed at 80° C. for 72 hours. Next, as shown in FIG. 9C, as the post light irradiation from a quartz glass 6 side, light irradiation was performed using a high pressure mercury lamp 8 (UL750, manufactured by Hoya Candeo Optronics Corp.) through the quartz glass 6 by adjusting the illuminance so that the energy at a wavelength of 300 to 400 nm was 100 J (40 mW, 2,500 seconds).

The illuminance was determined by measuring light of the high pressure mercury lamp (UL750, manufactured by Hoya Candeo Optronics Corp.) in a range of 250 to 700 nm at 1 nm intervals through the quartz glass 6 by a spectral radiometer (USR-45D-13, manufactured by Ushio Inc.). The data is shown in FIG. 4A.

An accumulated value in a range of 300 to 350 nm was 17.3 mW, an accumulated value in a range of 350 to 400 nm was 22.7 mW, and the total was 40 mW.

Accordingly, the optical element 500 for refractive index measurement was obtained. In FIG. 9E, the structure of the optical element 500 for refractive index measurement is shown.

Example 11

<Formation of Optical Element 510 for Refractive Index Measurement>

An optical element 510 for refractive index measurement was formed as described below.

Preceding steps before the post light irradiation were the same as those of the optical element 500 for refractive index measurement.

After annealing was performed at 80° C. for 72 hours, as the post light irradiation from a quartz glass 6 side, light irradiation was performed using a high pressure mercury lamp 8 (UL750, manufactured by Hoya Candeo Optronics Corp.) through a S-TIH11 glass substrate 9 as shown in FIG.

9D by adjusting the illuminance so that the energy at a wavelength of 300 to 400 nm was 100 J (13.2 mW, 7,576 seconds).

The illuminance was determined by measuring light of the high pressure mercury lamp 8 (UL750, manufactured by Hoya Candeo Optronics Corp.) in a range of 250 to 700 nm at 1 nm intervals through the S-TIH11 glass substrate 9 by a spectral radiometer (USR-45D-13, manufactured by Ushio Inc.). The data is shown in FIG. 4B.

An accumulated value in a range of 300 to 350 nm was 0.05 mW, an accumulated value in a range of 350 to 400 nm was 13.15 mW, and the total was 13.2 mW.

The ratio of the accumulated value in a range of 300 to 350 nm to the total accumulated value in a range of 300 to 400 nm was 0.4%.

Accordingly, the optical element 510 for refractive index measurement was obtained. In FIG. 9E, the structure of the optical element 510 for refractive index measurement is shown (the structure is the same as that of the optical element 500 for refractive index measurement).

[Evaluation of Optical Properties (Refractive Indices) of Optical Elements 200, 210, 300, 310, 320, 330, 500, and 510 for Refractive Index Measurement]

By using a refractometer (KPR-30, manufactured by Shimadzu Corp.), the refractive indices at the g line (435.8 nm), the f line (486.1 nm), the e line (546.1 nm), the d line (587.6 nm), and the c line (656.3 nm) of each cured sample were measured from a high refractive index glass 4 side. In addition, from the measured refractive index, the Abbe's number was calculated.

<Multilayer Diffractive Optical Element>

Next, after a diffractive optical shape was formed using the low refractive index and high dispersion material 11, the high refractive index and low dispersion material 21 was laminated thereon without forming any space therebetween to form a multilayer diffractive optical element, and the evaluation thereof was then performed.

Example 12

<Formation of Multilayer Diffractive Optical Element 400>

Figure 6A:
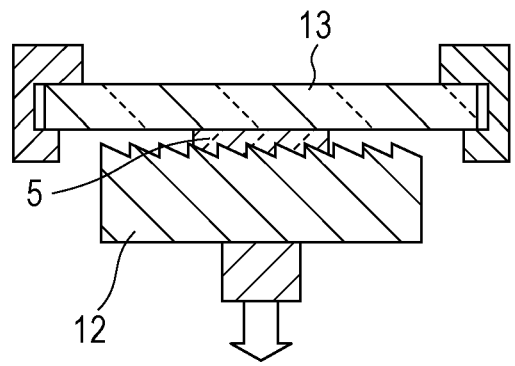
FIGS. 6A and 6B are each a schematic view of a method for forming a multilayer diffractive optical element according to aspects of the present invention.
Figure 6B:
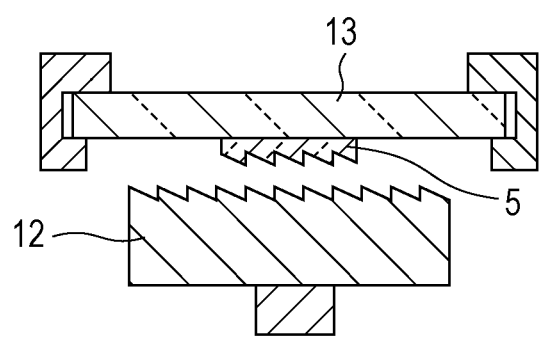

First, as shown in FIG. 6A, an ITO fine-particle dispersion material 5 (low refractive index and high dispersion material 11) and a glass substrate (hereinafter referred to as "flat glass plate" in some cases) 13 having a thickness of 2 mm were provided in this order on a mold 12 having a diffraction grating shape. After curing was performed by light irradiation using a high pressure mercury lamp (EXECURE250, Hoya Cande Optronics Corp.) at 14.2 mW/cm$^2$ for 211 seconds and at 20 mW/cm$^2$ for 600 seconds (illuminance through the glass substrate 13, illuminance meter: UIT-250, light receiving portion: UVD-S365), as shown in FIG. 6B, the ITO fine-particle dispersion material 5 was removed from the mold. Subsequently, annealing was performed in the air at 80° C. for 72 hours, so that a diffraction grating was formed. The grating height of the diffraction grating measured after the annealing was 10.8 μm, the distance from the glass substrate 13 to the valley of the grating was 2 μm (the average thickness of the ITO fine-particle dispersion material 5 was 7.4 μm), and the pitch was 80 μm.

Figure 7A:
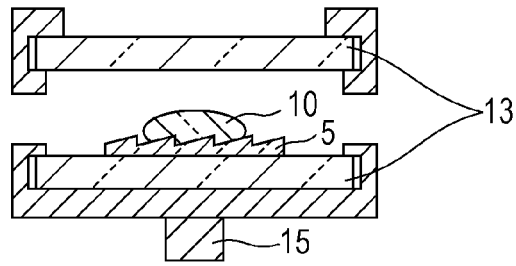
FIGS. 7A to 7E are each a schematic view of the method for forming a multilayer diffractive optical element according to aspects of the present invention.
Figure 7B:
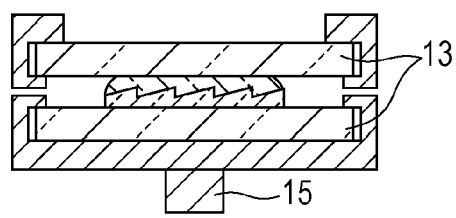
Figure 7C:

Next, the ITO fine-particle dispersion material 5 molded on the flat glass plate 13 was set together therewith in a molding jig 15, and on the ITO fine-particle dispersion material 5, a high refractive index material 10 (high refractive index and low dispersion material 21) was dripped (FIG. 7A). Another flat glass plate 13 was provided thereon (FIG. 7B) to extend the high refractive index material 10 by pressure application, so that as shown in FIG. 7C, the structure was formed in which an oxygen block layer of the high refractive index material 10 having a length of 300 μm from an air interface to the ITO fine-particle dispersion material 5 and a 35 μm-thick oxygen absorption layer of the high refractive index material 10 having a height larger than that of the grating of the ITO fine-particle dispersion material 5 were provided. After the sample thus prepared was cured by light irradiation using a high pressure mercury lamp (EXECURE250, Hoya Cande Optronics Corp.) at 14.2 mW/cm$^2$ for 211 seconds and at 20 mW/cm$^2$ for 600 seconds (illuminance through the flat glass plate 13, illuminance meter: UIT-250, light receiving portion: UVD-S365), annealing was performed at 80° C. for 72 hours.

Figure 7D:
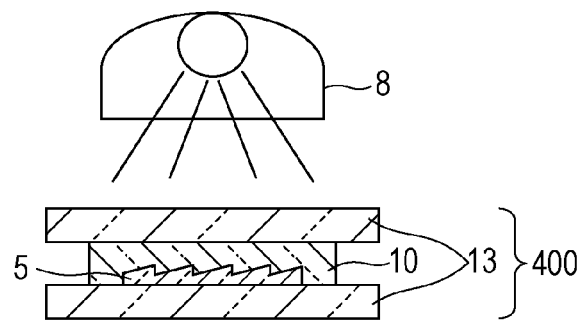

Subsequently, as the post light irradiation from a flat glass plate 13 side, light irradiation was performed using a high pressure mercury lamp 8 (UL750, manufactured by Hoya Candeo Optronics Corp.) through the flat glass plate 13 as shown in FIG. 7D by adjusting the illuminance so that the energy at a wavelength of 300 to 400 nm was 100 J (42 mW, 2,381 seconds).

The illuminance was determined by measuring light of the high pressure mercury lamp (UL750, manufactured by Hoya Candeo Optronics Corp.) in a range of 250 to 700 nm at 1 nm intervals through the flat glass plate 13 by a spectral radiometer (USR-45D-13, manufactured by Ushio Inc.). The data is shown in FIG. 4A.

An accumulated value in a range of 300 to 350 nm was 14.4 mW, an accumulated value in a range of 350 to 400 nm was 25.6 mW, and the total was 40 mW.

The ratio of the accumulated value in a range of 300 to 350 nm to the total accumulated value in a range of 300 to 400 nm was 36.1%.

Accordingly, a multilayer diffractive optical element 400 was obtained. In FIG. 7C, the structure of the optical element 400 for refractive index measurement is shown.

Example 13

<Formation of Multilayer Diffractive Optical Element 410>

A multilayer diffractive optical element 410 was formed as described below.

Preceding steps before the post light irradiation were the same as those of the multilayer diffractive optical element 400.

Figure 7E:
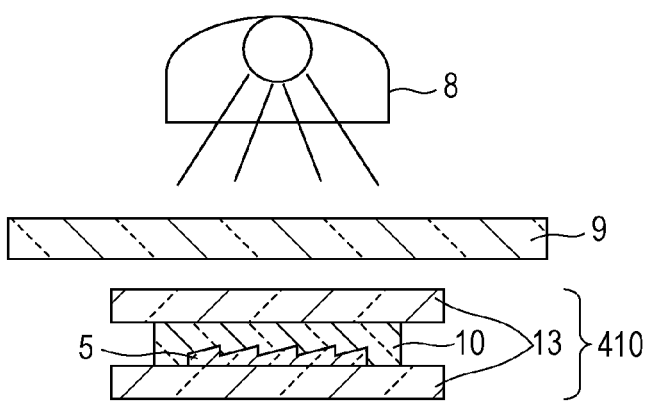

After annealing was performed at 80° C. for 72 hours, as the post light irradiation from a flat glass plate 13 side, light irradiation was performed using a high pressure mercury lamp 8 (UL750, manufactured by Hoya Candeo Optronics Corp.) through a S-TIH11 glass substrate 9 as shown in FIG. 7E by adjusting the illuminance so that the energy at a wavelength of 300 to 400 nm was 100 J (13.9 mW, 7,194 seconds).

The illuminance was determined by measuring light of the high pressure mercury lamp (UL750, manufactured by Hoya Candeo Optronics Corp.) in a range of 250 to 700 nm at 1 nm intervals through the S-TIH11 glass substrate 9 by a spectral radiometer (USR-45D-13, manufactured by Ushio Inc.). The data is shown in FIG. 4B.

An accumulated value in a range of 300 to 350 nm was 0.05 mW, an accumulated value in a range of 350 to 400 nm was 13.15 mW, and the total was 13.2 mW.

The ratio of the accumulated value in a range of 300 to 350 nm to the total accumulated value in a range of 300 to 400 nm was 0.4%.

Accordingly, the multilayer diffractive optical element 410 was obtained. In FIG. 7C, the multilayer diffractive optical element 410 is shown (the structure is the same as that of the multilayer diffractive optical element 400).

<Evaluation of Diffraction Efficiency>

As for the diffraction efficiency, after spot light was made incident on the above multilayer diffractive optical element, and the amount of the whole transmitted light passing therethrough was measured by a light receiving portion in close contact with the element, the amount of light of the design order (first-order diffracted light) was measured, and the ratio in the amount of light (amount of light of design order/amount of whole transmitted light) was defined as the diffraction efficiency.

<Evaluation of Light Resistance>

For the optical elements 200, 210, 300, 310, 320, 330, 500, and 510 for refractive index measurement and the multilayer diffractive optical elements 400 and 410, a light resistance test was performed at 5 mW (irradiation intensity at 300 to 400 nm) for 200 hours using a light resistance tester (xenon weather meter X75, manufactured by Suga Test Instruments Co., Ltd.).

Figure 8:
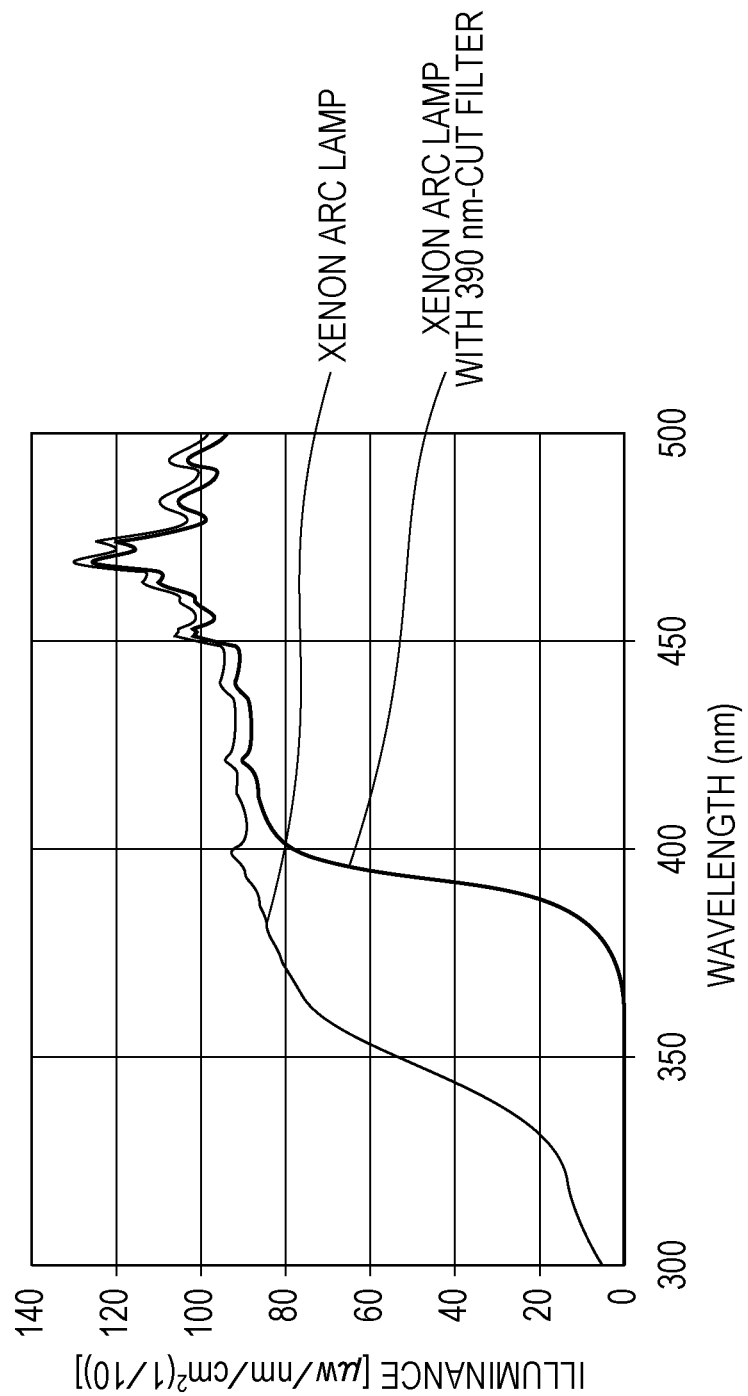
FIG. 8 is a graph showing spectra obtained in a light resistance test with and without through a 390 nm-cut filter.

In this test, the light incident on each sample was light passing through a 390-nm cut filter (actually light leakage occurred to 360 nm). FIG. 8 shows a spectrum of a xenon arc lamp through a 390-nm cut filter. The irradiation intensity through a 390-nm cut filter was 0.8 mW (irradiation intensity at a wavelength of 300 to 400 nm).

Subsequently, the refractive index of the optical element for refractive index measurement and the diffraction efficiency of the multilayer diffractive optical element were measured.

<Measurement of Oxygen Permeability and Solubility of Material>

As shown in FIG. 9A, on a quartz glass 4 having a thickness of 1 mm, a spacer 7 having a thickness of 100 μm and an ITO fine-particle dispersion material 5 (low refractive index and high dispersion material 11) or a high refractive index material 10 (high refractive index and low dispersion material 21) were arranged. A quartz glass 6 having a thickness of 1 mm was further provided thereon with the spacer 7 provided therebetween, so that the ITO fine-particle dispersion material 5 (low refractive index and high dispersion material 11) or the high refractive index material 10 (high refractive index and low dispersion material 21) was extended by pressure application. The structure thus formed was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that a measurement material was cured. After the curing was performed, the film was peeled away from the quartz glasses, and a heat treatment was performed at 80° C. for 72 hours.

The oxygen permeability and the oxygen solubility of the film formed as described above were measured using a differential pressure type gas permeability measurement device (GTR-30×ATR, manufactured by GTR Tec Corp.) at 23±2° C. (also at 50±2° C. and 80±2° C. for acceleration factor conversion for subsequent acceleration tests).

However, when the oxygen permeability of the optical element 210 for refractive index measurement obtained by the differential pressure type gas permeability measurement is compared with a travel distance of oxygen in the actual optical element 210 for refractive index measurement, the oxygen permeability of the actual optical element 210 for refractive index measurement estimated from the travel distance of oxygen is approximately 100 times the oxygen permeability obtained by the differential pressure type gas permeability measurement. Accordingly, although the oxygen permeability obtained by the differential pressure type gas permeability measurement indicates relative oxygen permeability and oxygen solubility between the films, when the oxygen diffusion behavior in the actual film is considered, the above permeability must be regarded as one hundredth thereof for calculation.

<Change with Time (Measurement by Oxidation Acceleration Device)>

The progress of oxidation was defined by the travel distance of oxidation from the end portion of the optical element to the boundary of discoloration of the ITO fine-particle dispersion material 5 (low refractive index and high dispersion material 11).

The travel distance of oxidation of a sample of the optical element 210 for refractive index measurement which was left for 365 days was 3 mm. On the other hand, when an oxidation acceleration device was formed (oxygen concentration: 100%, 6 atmospheric pressure, 60° C.), and the optical element 210 for refractive index measurement was left therein for 66 hours, the travel distance of oxidation was also 3 mm.

The acceleration factor was 132 times. In addition, since the acceleration factor theoretically obtained from 5 times the oxygen concentration (100%←20%)×6 times the pressure (6 atm←1 atm)×temperature coefficient of permeability (4.30=P(60° C.)/P(23° C.)) was 129 times and was coincide with the measured acceleration factor, the acceleration factors of the other materials were also theoretically obtained, and the times thereof were obtained.

In this case, the element was placed in the oxidation acceleration device for 72 hours.

When the element was formed only from the ITO fine-particle dispersion material 5 (low refractive index and high dispersion material 11), the corresponding time was 25.4 years by calculation, and when the oxygen block layer of the high refractive index material 10 having a length of 300 μm to the ITO fine-particle dispersion material 5 was formed, the corresponding time was 24.6 years by calculation. Hence, the test result obtained in this case was regarded to correspond to that obtained when the sample was left for 25 years under common use conditions.

<Evaluation Results>

Initial Evaluation Results

The multilayer diffractive optical elements 400 and 410 each formed from the low refractive index and high dispersion material 11 and the high refractive index and low dispersion material 21 had a diffraction efficiency of 99.5% or more in the whole visible region.

The low refractive index and high dispersion material 11 of the optical element 200 for refractive index measurement had refractive indices $(n_g, n_f, n_e, n_d, n_C)$=(1.599, 1.586, 1.575, 1.567, 1.556) and $(v_d, \theta_{gF})$=(18.6, 0.41).

The low refractive index and high dispersion material 11 of the optical element 210 for refractive index measurement had refractive indices $(n_g, n_f, n_e, n_d, n_C)$=(1.599, 1.587, 1.575, 1.568, 1.557) and $(v_d, \theta_{gF})$=(18.6, 0.41).

The low refractive index and high dispersion material 11 of the optical element 300 for refractive index measurement had refractive indices $(n_g, n_f, n_e, n_d, n_C)$=(1.600, 1.588, 1.576, 1.568, 1.557), and $(v_d, \theta_{gF})$=(18.8, 0.40) is obtained.

The low refractive index and high dispersion material 11 of the optical element 310 for refractive index measurement had refractive indices $(n_g, n_f, n_e, n_d, n_C)$=(1.600, 1.587, 1.576, 1.568, 1.557) and $(v_d, \theta_{gF})$=(19.0, 0.42).

The low refractive index and high dispersion material 11 of the optical element 320 for refractive index measurement had refractive indices $(n_g, n_f, n_e, n_d, n_C)$=(1.600, 1.588, 1.577, 1.569, 1.558) and $(v_d, \theta_{gF})$=(19.1, 0.41).

The low refractive index and high dispersion material 11 of the optical element 330 for refractive index measurement had refractive indices $(n_g, n_f, n_e, n_d, n_C)=(1.600, 1.588, 1.576, 1.569, 1.558)$ and $(\nu_d, \theta_{gF})=(19.21, 0.42)$.

<Results of Oxygen Permeability and Solubility of Material>

Hereinafter, "E" indicates an exponential function with 10 as the base.

The low refractive index and high dispersion material 11 had (oxygen permeability $P/cm^3 \cdot cm \cdot (cm^2 \cdot s \cdot cmHg)^{-1}$, oxygen solubility $S/cm^3 \; (cm^3 \cdot cmHg)^{-1}) = (4.06\ E^{-11}, 1.4\ E^{-3})$.

The high refractive index and low dispersion material 21 had (oxygen permeability $P/cm^3 \cdot cm \cdot (cm^2 \cdot s \cdot cmHg)^{-1}$, oxygen solubility $S/cm^3 \; (cm^3 \cdot cmHg)^{-1}) = (8.58\ E^{-12}, 3.3\ E^{-3})$.

The results of light resistance obtained by the light resistance test are shown in Table 1.

TABLE 1

| | OPTICAL ELEMENT NO. | TYPE OF OPTICAL ELEMENT | OXYGEN PERMEATION INHIBITION/OXYGEN ABSORPTION | | | | POST LIGHT IRRADIATION STEP EXECUTION |
|---|---|---|---|---|---|---|---|
| | | | ELEMENT STRUCTURE | | MATERIAL PROPERTIES | | |
| | | | OXYGEN PERMEATION INHIBITION LAYER | OXYGEN ABSORPTION | OXYGEN PERMEABILITY $P/cm3 \cdot cm \cdot (cm2 \cdot s \cdot cmHg) - 1$ | OXYGEN SOLUBILITY $S/cm3 \cdot (cm3 \cdot cmHg) - 1$ | |
| EXAMPLE 1 | 200 | REFRACTIVE INDEX SAMPLE | NO | NO | | | YES |
| EXAMPLE 2 | 210 | REFRACTIVE INDEX SAMPLE | NO | NO | | | YES |
| COMPARATIVE EXAMPLE 1 | 220 | REFRACTIVE INDEX SAMPLE | NO | NO | | | NO |
| EXAMPLE 3 | 300 | REFRACTIVE INDEX SAMPLE | 300 μm | 37 μm | 8.58E−12 | 3.3E−03 | YES |
| EXAMPLE 4 | 310 | REFRACTIVE INDEX SAMPLE | 300 μm | 37 μm | 8.58E−12 | 3.3E−03 | YES |
| EXAMPLE 5 | 320 | REFRACTIVE INDEX SAMPLE | 300 μm | 37 μm | 8.58E−12 | 3.3E−03 | YES |
| EXAMPLE 6 | 330 | REFRACTIVE INDEX SAMPLE | 300 μm | 37 μm | 8.58E−12 | 3.3E−03 | YES |
| EXAMPLE 7 | 340 | REFRACTIVE INDEX SAMPLE | 300 μm | 37 μm | 8.58E−12 | 3.3E−03 | NO |
| EXAMPLE 8 | 350 | REFRACTIVE INDEX SAMPLE | 300 μm | 37 μm | 4.06E−11 | 1.4E−03 | YES |
| EXAMPLE 9 | 360 | REFRACTIVE INDEX SAMPLE | 300 μm | 37 μm | 4.06E−11 | 1.4E−03 | YES |
| COMPARATIVE EXAMPLE 2 | 370 | REFRACTIVE INDEX SAMPLE | 300 μm | 37 μm | 4.06E−11 | 1.4E−03 | NO |
| EXAMPLE 10 | 500 | REFRACTIVE INDEX SAMPLE | 300 μm | NO | 8.58E−12 | 3.3E−03 | YES |
| EXAMPLE 11 | 510 | REFRACTIVE INDEX SAMPLE | 300 μm | NO | 8.58E−12 | 3.3E−03 | YES |
| EXAMPLE 12 | 400 | DIFFRACTIVE OPTICAL ELEMENT | 300 μm | 35 μm | 8.58E−12 | 3.3E−03 | YES |
| EXAMPLE 13 | 410 | DIFFRACTIVE OPTICAL ELEMENT | 300 μm | 35 μm | 8.58E−12 | 3.3E−03 | YES |
| EXAMPLE 14 | 420 | DIFFRACTIVE OPTICAL ELEMENT | 300 μm | 35 μm | 8.58E−12 | 3.3E−03 | NO |
| COMPARATIVE EXAMPLE 3 | 430 | DIFFRACTIVE OPTICAL ELEMENT | 300 μm | 35 μm | 4.06E−11 | 1.4E−03 | NO |

| | POST LIGHT IRRADIATION STEP | | ENVIRONMENTAL DURABILITY TEST | | | |
|---|---|---|---|---|---|---|
| | | | OXIDATION ACCELERATION TEST | | LIGHT RESISTANCE TEST | |
| | POST LIGHT IRRADIATION | EXCESSIVE LIGHT IRRADIATION (300-350cut) | RANK | TRAVEL DISTANCE OF OXIDATION (mm) | CHANGE IN REFRACTIVE INDEX Δn(CHANGE IN DIFFRACTION EFFICIENCY OF DIFFRACTION GRATING) | RANK | CHANGE IN REFRACTIVE INDEX Δn(CHANGE IN DIFFRACTION EFFICIENCY OF DIFFRACTION GRATING) |
| EXAMPLE 1 | 100 J | — | C | 15.3 | 0.004 | A | 0.000 |
| EXAMPLE 2 | — | 100 J | C | 15.3 | 0.003 | A | −0.001 |
| COMPARATIVE EXAMPLE 1 | — | — | C | 15.3 | 0.002 | B | −0.002 |
| EXAMPLE 3 | 100 J | — | A | 2.3 | | A | 0.000 |
| EXAMPLE 4 | 50 J | — | A | 2.3 | | A | 0.000 |

TABLE 1-continued

| | | | | | | | | |
|---|---|---|---|---|---|---|---|---|
| EXAMPLE 5 | — | 100 J | A | 2.3 | | A | −0.001 | |
| EXAMPLE 6 | — | 50 J | A | 2.3 | | A | −0.001 | |
| EXAMPLE 7 | — | — | A | 2.3 | | B | −0.002 | |
| EXAMPLE 8 | 100 J | — | C | 15.3 | 0.004 | A | 0.000 | |
| EXAMPLE 9 | — | 100 J | C | 15.3 | 0.003 | A | −0.001 | |
| COMPARATIVE EXAMPLE 2 | — | — | C | 15.3 | 0.002 | B | −0.002 | |
| EXAMPLE 10 | 100 J | — | B | 5.5 | | A | 0.000 | |
| EXAMPLE 11 | — | 100 J | B | 5.5 | | A | −0.001 | |
| EXAMPLE 12 | 100 J | — | A | 2.2 | 0.0 | A | 0.0 | |
| EXAMPLE 13 | — | 100 J | A | 2.2 | 0.0 | A | 0.0 | |
| EXAMPLE 14 | — | — | A | 2.2 | 0.0 | B | −0.7 | |
| COMPARATIVE EXAMPLE 3 | — | — | C | 15.3 | −0.7 | B | −0.7 | |

When the change in the diffraction efficiency was 0.5% or less, or the change in the refractive index was less than 0.002 as the result of the light resistance, it was ranked as A, and when the change in the diffraction efficiency was more than 0.5%, or the change in the refractive index was 0.002 or more, it was ranked as B. In the case of the multilayer diffractive optical elements 400 and 410 each formed from the low refractive index and high dispersion material 11 and the high refractive index and low dispersion material 21, the diffraction efficiency in the whole visible region was 99.5% or more and was not so much changed from the initial value.

(Refractive Index and Optical Constant)

Since the low refractive index and high dispersion material 11 of the optical element 200 for refractive index measurement had refractive indices $(n_g, n_f, n_e, n_d, n_C)=$ (1.599, 1.586, 1.575, 1.567, 1.556) and $(v_d, \theta_{gF})=(18.6, 0.41)$, the change in the refractive index from the initial value was hardly observed.

Since the low refractive index and high dispersion material 11 of the optical element 210 for refractive index measurement had refractive indices $(n_g, n_f, n_e, n_d, n_C)=$ (1.599, 1.586, 1.575, 1.567, 1.556) and $(v_d, \theta_{gF})=(18.7, 0.41)$, the change in the refractive index from the initial value was from 0.000 to −0.0010.

Since the low refractive index and high dispersion material 11 of the optical element 300 for refractive index measurement had refractive indices $(n_g, n_f, n_e, n_d, n_C)=$ (1.600, 1.587, 1.576, 1.568, 1.557) and $(v_d, \theta_{gF})=(18.71, 0.41)$, the change in the refractive index from the initial value was hardly observed.

Since the low refractive index and high dispersion material 11 of the optical element 310 for refractive index measurement had refractive indices $(n_g, n_f, n_e, n_d, n_C)=$ (1.600, 1.588, 1.576, 1.568, 1.557) and $(v_d, \theta_{gF})=(18.6, 0.40)$, the change in the refractive index from the initial value was hardly observed.

Since the low refractive index and high dispersion material 11 of the optical element 320 for refractive index measurement had refractive indices $(n_g, n_f, n_e, n_d, n_C)=$ (1.600, 1.587, 1.576, 1.568, 1.557) and $(v_d, \theta_{gF})=(18.9, 0.41)$, the change in the refractive index from the initial value was from 0.000 to −0.0010.

Since the low refractive index and high dispersion material 11 of the optical element 330 for refractive index measurement had refractive indices $(n_g, n_f, n_e, n_d, n_C)=$ (1.600, 1.587, 1.576, 1.568, 1.557) and $(v_d, \theta_{gF})=(18.7, 0.40)$, the change in the refractive index from the initial value was from 0.000 to −0.001.

The low refractive index and high dispersion material 11 of the optical element 500 for refractive index measurement had refractive indices $(n_g, n_f, n_e, n_d, n_C)=$ (1.600, 1.588, 1.576, 1.568, 1.557) and $(v_d, \theta_{gF})=(18.8, 0.40)$.

The low refractive index and high dispersion material 11 of the optical element 510 for refractive index measurement had refractive indices $(n_g, n_f, n_e, n_d, n_C)=$ (1.600, 1.588, 1.577, 1.569, 1.558) and $(v_d, \theta_{gF})=(19.1, 0.41)$.

<Results of Oxidation Acceleration Test>
(Travel Speed of Oxidation, Refractive Index, and Optical Constant)

The results of an oxidation acceleration test are shown in Table 1.

A travel distance of oxidation of 2.5 mm or less (≤2.5 mm) was ranked as A, a travel distance in a range of more than 2.5 to 10 mm was ranked as B, and a travel distance of more than 10 mm was ranked as C.

In the optical element 200 for refractive index measurement, the travel distance of oxidation from the end portion was 15.3 mm which was larger than a width of 2.5 mm of an annular zone located around an effective diameter zone (hereinafter simply referred to as "the width of 2.5 mm of the annular zone" in some cases) and was extended in the effective diameter zone by 12.8 mm.

An oxidized portion of the low refractive index and high dispersion material 11 had refractive indices $(n_g, n_f, n_e, n_d, n_C)=$ (1.600, 1.588, 1.578, 1.571, 1.560) and $(v_d, \theta_{gF})=(20.0, 0.42)$, and the change in the refractive index from the initial value was from +0.002 to +0.004 and was out of the acceptable range.

In the optical element 210 for refractive index measurement, the travel distance of oxidation from the end portion was 15.3 mm which was larger than the width of 2.5 mm of the annular zone and was extended in the effective diameter zone by 12.8 mm.

The low refractive index and high dispersion material 11 had refractive indices $(n_g, n_f, n_e, n_d, n_C)=$ (1.600, 1.588, 1.578, 1.571, 1.560) and $(v_d, \theta_{gF})=(20.0, 0.42)$, and the change in the refractive index from the initial value was from +0.001 to +0.003 and was out of the acceptable range.

The travel distance of oxidation from the end portion of the optical element 300 for refractive index measurement was 2.3 mm which was within the width of 2.5 mm of the annular zone. Since the end portion was small, the refractive index could not be measured.

The travel distance of oxidation from the end portion of the optical element 310 for refractive index measurement was 2.3 mm which was within the width of 2.5 mm of the annular zone. Since the end portion was small, the refractive index could not be measured.

The travel distance of oxidation from the end portion of the optical element 320 for refractive index measurement was 2.3 mm which was within the width of 2.5 mm of the annular zone. Since the end portion was small, the refractive index could not be measured.

The travel distance of oxidation from the end portion of the optical element 330 for refractive index measurement was 2.3 mm which was within the width of 2.5 mm of the annular zone. Since the end portion was small, the refractive index could not be measured.

The travel distance of oxidation from the end portion of the optical element 500 for refractive index measurement was 5.0 mm which was larger than the width of 2.5 mm of the annular zone and was extended in the effective diameter zone by 2.5 mm. Since the end portion was small, the refractive index could not be measured.

The travel distance of oxidation from the end portion of the optical element 510 for refractive index measurement was 5.0 mm which was larger than the width of 2.5 mm of the annular zone and was extended in the effective diameter zone by 2.5 mm. Since the end portion was small, the refractive index could not be measured.

The travel distance of oxidation from the end portion of the multilayer diffractive optical element 400 was 2.3 mm which was within the width of 2.5 mm of the annular zone. The change in the diffraction efficiency and inconveniences of the whole element were not observed.

The travel distance of oxidation from the end portion of the multilayer diffractive optical element 410 was 2.3 mm which was within the width of 2.5 mm of the annular zone. The change in the diffraction efficiency and inconveniences of the whole element were not observed.

Comparative Example 1

In Comparative Example 1, the post light irradiation was not performed on the element for refractive index measurement.
<Formation of Optical Element 220 for Refractive Index Measurement>

An optical element 220 for refractive index measurement had the same structure as that of the optical element 200 or 210 for refractive index measurement and was formed as described below without performing the post light irradiation.

First, as shown in FIG. 2A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that a measurement sample was cured. After the curing was performed, annealing was performed at 80° C. for 72 hours.

Accordingly, the optical element 220 for refractive index measurement was obtained. In FIG. 2B, the optical element 220 for refractive index measurement is shown (the element structure is the same as that of the optical element 200 for refractive index measurement).

Example 7

<Formation of Optical Element 340 for Refractive Index Measurement>

An optical element 340 for refractive index measurement was formed as described below.

The optical element 340 for refractive index measurement had the same structure as that of the optical element 300 for refractive index measurement and was formed as described below without performing the post light irradiation.

First, as shown in FIG. 5A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that the ITO fine-particle dispersion material 5 was cured. After the curing was performed, the quartz glass 6 was peeled away, and annealing was performed at 80° C. for 72 hours. Subsequently, a spacer 11 having a thickness of 50 μm and a high refractive index material 10 (high refractive index and low dispersion material 21) were arranged as shown in FIG. 5B, and the quartz glass 6 having a thickness of 1 mm was provided on the structure formed as described above with the spacer 11 interposed therebetween to extend the high refractive index material 10 by pressure application. As a result, as shown in FIG. 5E, the structure was formed in which an oxygen block layer of the high refractive index material 10 having a length of 300 μm from an air interface to the ITO fine-particle dispersion material 5 and an oxygen absorption layer of the high refractive index material 10 on the ITO fine-particle dispersion material 5 were provided. Next, the structure as described above was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that the high refractive index material 10 was cured. After the curing was performed, annealing was performed at 80° C. for 72 hours.

Accordingly, the optical element 340 for refractive index measurement was obtained. In FIG. 5E, the structure of the optical element 340 for refractive index measurement is shown (the structure is the same as that of the optical element 300 for refractive index measurement).

[Preparation of High Refractive Index and Low Dispersion Material 22]

After a fine-particle dispersion liquid (average particle diameter of fine particles: 10 nm, concentration of zirconium oxide: 10 percent by weight, no surface treatment agent, manufactured by Sumitomo Osaka Cement Co., Ltd.) in which zirconium oxide was dispersed in a ethanol solvent was processed by solvent displacement with acetone, DISPERBYK-163 (high molecular weight block copolymer, manufactured by BYK Japan KK) was added thereto as a dispersant, and solvent displacement was then performed with toluene, so that a zirconium oxide liquid (concentration of zirconium oxide: 9.5 percent by weight, concentration of a surface treatment agent: 2.57 percent by weight) in which zirconium oxide was dispersed in a toluene solution was formed.

Next, 161.2 g of the zirconium oxide liquid formed as described above was mixed with 10.57 g of a mixture as an ultraviolet curable acrylic resin containing 20 percent by weight of tris(2-acryloxyethyl)isocyanurate, 25 percent by weight of pentaerythritol triacrylate, 40 percent by weight of dicyclopentenyl oxyethyl methacrylate, 13 percent by weight of a urethane modified polyester acrylate, and 2 percent by weight of 1-hydroxycyclohexyl phenyl ketone. This mixed solution was received in an evaporator, and toluene was removed finally at an oil bath temperature of 45° C. and a set pressure of 2 hPas for 20 hours, so that a high refractive index and low dispersion material 22 was prepared.

In addition, the particle diameter of zirconium oxide was measured by a laser type particle size analyzer (ELS, manufactured by Otsuka Electronics Co., Ltd.). Although the value submitted by Sumitomo Osaka Cement Co., Ltd. was 3 to 5 nm, since the laser type particle size distribution was obtained by measuring particle diameters including that of a surface treatment agent, it was estimated the data obtained thereby was different from the actual value.

In addition, by a TGA (manufactured by PerkinElmer), the high refractive index and low dispersion material 22 was fired, and the inorganic solid component thereof was quantitatively determined, so that a content of 53.7 percent by weight was obtained.

The content of a remaining solvent (toluene) measured by a gas chromatography (5890 series II, manufactured by Hewlett Packard) was 0.005 percent by weight or less and was the detection limit or less.

Example 8

<Formation of Optical Element 350 for Refractive Index Measurement>

An optical element 350 for refractive index measurement was formed as described below.

First, as shown in FIG. 5A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm² (illuminance through the quartz glass, illuminance meter: UIT-250, light receiving portion: UVD-S365) for 1,300 seconds (26 J), so that the ITO fine-particle dispersion material 5 was cured. After the curing was performed, the quartz glass 6 was peeled away, and annealing was performed at 80° C. for 72 hours. Subsequently, after a spacer 11 having a thickness of 50 μm was arranged, and unlike the case of the optical element 300 for refractive index measurement, the high refractive index and low dispersion material 22 was also arranged as a high refractive index material 10 instead of using the high refractive index and low dispersion material 21 as shown in FIG. 5B, the quartz glass 6 having a thickness of 1 mm was provided on the high refractive index material 10 with the spacer 11 interposed therebetween to extend the high refractive index material 10 by pressure application. As a result, as shown in FIG. 5E, a sample was formed in which an oxygen block layer of the high refractive index material 10 having a length of 300 μm from an air interface to the ITO fine-particle dispersion material 5 and an oxygen absorption layer of the high refractive index material 10 on the ITO fine-particle dispersion material 5 were provided. Next, the sample as described above was irradiated by a high pressure mercury lamp (UL750, manufactured by Hoya Candeo Optronics Corp.) at 20 mW/cm² (illuminance through the quartz glass, illuminance meter: UIT-250, light receiving portion: UVD-S365) for 1,300 seconds (26 J), so that the high refractive index material 10 was cured. After the curing was performed, annealing was performed at 80° C. for 72 hours. Next, as shown in FIG. 5C, as the post light irradiation from a quartz glass 6 side, light irradiation was performed using a high pressure mercury lamp 8 (UL750, manufactured by Hoya Candeo Optronics Corp.) through the quartz glass 6 by adjusting the illuminance so that the energy at a wavelength of 300 to 400 nm was 100 J (40 mW, 2,500 seconds).

The illuminance was determined by measuring light of the high pressure mercury lamp (UL750, manufactured by Hoya Candeo Optronics Corp.) in a range of 250 to 700 nm at 1 nm intervals through the quartz glass 6 by a spectral radiometer (USR-45D-13, manufactured by Ushio Inc.). The data is shown in FIG. 4A.

An accumulated value in a range of 300 to 350 nm was 17.3 mW, an accumulated value in a range of 350 to 400 nm was 22.7 mW, and the total was 40 mW.

Accordingly, the optical element 350 for refractive index measurement was obtained. In FIG. 5E, the structure of the optical element 350 for refractive index measurement is shown.

Example 9

<Formation of Optical Element 360 for Refractive Index Measurement>

An optical element 360 for refractive index measurement was formed as described below.

Preceding steps before the post light irradiation were the same as those of the optical element 350 for refractive index measurement.

After annealing was performed at 80° C. for 72 hours, as the post light irradiation from a quartz glass 6 side, light irradiation was performed using a high pressure mercury lamp 8 (UL750, manufactured by Hoya Candeo Optronics Corp.) through a S-TIH11 glass substrate 9 as shown in FIG. 5D by adjusting the illuminance so that the energy at a wavelength of 300 to 400 nm was 50 J (13.2 mW, 3,788 seconds).

The illuminance was determined by measuring light of the high pressure mercury lamp 8 (UL750, manufactured by Hoya Candeo Optronics Corp.) in a range of 250 to 700 nm at 1 nm intervals through the S-TIH11 glass substrate 9 by a spectral radiometer (USR-45D-13, manufactured by Ushio Inc.). The data is shown in FIG. 4B. FIG. 4B shows a spectrum of the high pressure mercury lamp for the optical element of the example according to aspects of the present invention through the S-YIH11 substrate.

An accumulated value in a range of 300 to 350 nm was 0.05 mW, an accumulated value in a range of 350 to 400 nm was 13.15 mW, and the total was 13.2 mW.

The ratio of the accumulated value in a range of 300 to 350 nm to the total accumulated value in a range of 300 to 400 nm was 0.4%.

Accordingly, the optical element 360 for refractive index measurement was obtained. In FIG. 5E, the structure of the optical element 360 for refractive index measurement is shown (the structure is the same as that of the optical element 330 for refractive index measurement).

Comparative Example 2

<Formation of Optical Element 370 for Refractive Index Measurement>

An optical element 370 for refractive index measurement was formed as described below.

First, as shown in FIG. 5A, a spacer 7 having a thickness of 12.5 μm and an ITO fine-particle dispersion material 5 (low refractive index and high dispersion material 11) were arranged on a high refractive index glass (S-TIH11: manufactured by Hoya Corp.) 4 having a thickness of 1 mm. In addition, a quartz glass 6 having a thickness of 1 mm was placed on the ITO fine-particle dispersion material 5 with the spacer 7 provided therebetween so as to extend the ITO fine-particle dispersion material 5 by pressure application. The structure thus formed was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that the ITO fine-particle dispersion material 5 was cured. After the curing was performed, the quartz glass 6 was peeled away, and annealing was performed at 80° C. for 72 hours. Subsequently, after a spacer 11 having a thickness of 50 μm was arranged, and unlike the case of the optical element 300 for refractive index measurement, the high refractive index and low dispersion material 22 was also arranged as a high refractive index material 10 instead of using the high refractive index and low dispersion material 21 as shown in FIG. 5B, the quartz glass 6 having a thickness of 1 mm was provided on the high refractive index material 10 with the spacer 11 interposed therebetween to extend the high refractive index material 10 by pressure application. As a result, as shown in FIG. 5E, the structure was formed in which an oxygen block layer of the high refractive index material 10 having a length of 300 μm from an air interface to the ITO fine-particle dispersion material 5 and an oxygen absorption layer of the high refractive index material 10 on the ITO fine-particle dispersion material 5 were provided. Next, the structure as described above was irradiated by a high pressure mercury lamp (UL750, manufactured by Hoya Candeo Optronics Corp.) at 20 mW/cm$^2$ (illuminance through the quartz glass, illuminance meter: UIT-250, light receiving portion: UVD-S365) for 1,300 seconds (26 J), so that the high refractive index material 10 was cured. After the curing was performed, annealing was performed at 80° C. for 72 hours.

Accordingly, the optical element 370 for refractive index measurement was obtained. In FIG. 5E, the structure of the optical element 370 for refractive index measurement is shown (the structure is the same as that of the optical element 350 for refractive index measurement).

[Evaluation of Optical Properties (Refractive Indices) of Optical Elements 220, 340, 350, 360, and 370 for Refractive Index Measurement]

By using a refractometer (KPR-30, manufactured by Shimadzu Corp.), the refractive indices of each cured sample were measured as in the case of Example 1, and from the measured refractive index, the Abbe's number was calculated.

[Measurement of Oxygen Permeability and Solubility of Material of High Refractive Index and Low Dispersion Material 22]

As in the case of Example 1, the oxygen permeability and the oxygen solubility were measured using a differential pressure type gas permeability measurement device (GTR-30×ATR, manufactured by GTR Tec Corp.) at 23±2° C. (also at 50±2° C. and 80±2° C. for acceleration conversion calculation for subsequent acceleration tests).

<Multilayer Diffractive Optical Element>

Next, after a diffractive optical shape was formed from the low refractive index and high dispersion material 11, the high refractive index and low dispersion material 21 was laminated thereon without forming any space therebetween to form a multilayer diffractive optical element, and the evaluation thereof was then performed.

Unlike the cases of Examples 12 and 13, the post radiation was not performed on the multilayer diffractive optical element.

Example 14

<Formation of Multilayer Diffractive Optical Element 420>

First, as shown in FIG. 6A, an ITO fine-particle dispersion material 5 (low refractive index and high dispersion material 11) and a glass substrate (hereinafter referred to as "flat glass plate" in some cases) 13 having a thickness of 2 mm were arranged in this order on a mold 12 having a diffraction grating shape. After curing was performed by light irradiation using a high pressure mercury lamp (EXECURE250, Hoya Cande Optronics Corp.) at 14.2 mW/cm$^2$ for 211 seconds and at 20 mW/cm$^2$ for 600 seconds (illuminance through the glass substrate 13, illuminance meter: UIT-250, light receiving portion: UVD-S365), as shown in FIG. 6B, the ITO fine-particle dispersion material 5 was removed from the mold. Subsequently, annealing was performed in the air at 80° C. for 72 hours, so that a diffraction grating was formed.

The grating height of the diffraction grating measured after the annealing was set to 10.8 μm, the distance from the glass substrate 13 to the valley of the grating was set to 2 μm (the average thickness of the ITO fine-particle dispersion material 5 was 7.4 μm), and the pitch was 80 μm.

Next, the ITO fine-particle dispersion material 5 molded on the flat glass plate 13 was set together therewith in a molding jig 15, and on the ITO fine-particle dispersion material 5, a high refractive index material 10 (high refractive index and low dispersion material 21) was dripped (FIG. 7A). Another flat glass plate 13 was provided thereon (FIG. 7B) to extend the high refractive index material 10 by pressure application so that a resin thickness was larger than the grating height by 30 μm and the pitch was 80 μm. As a result, as shown in FIG. 7C, a sample was formed in which an oxygen block layer of the high refractive index material 10 having a length of 300 μm from an air interface to the ITO fine-particle dispersion material 5 and a 35 μm-thick oxygen absorption layer of the high refractive index material 10 having a height larger than that of the grating of the ITO fine-particle dispersion material 5 were provided. After the sample thus prepared was cured by light irradiation using a high pressure mercury lamp (EXECURE250, Hoya Cande Optronics Corp.) at 14.2 mW/cm$^2$ for 211 seconds and at 20 mW/cm$^2$ for 600 seconds (illuminance through the flat glass plate 13, illuminance meter: UIT-250, light receiving portion: UVD-S365), annealing was performed at 80° C. for 72 hours.

Accordingly, a multilayer diffractive optical element 420 was formed. In FIG. 7C, the structure of the multilayer diffractive optical element 420 is shown (the structure is the same as that of the multilayer diffractive optical element 400).

Comparative Example 3

<Formation of Multilayer Diffractive Optical Element 430>

First, as shown in FIG. 6A, an ITO fine-particle dispersion material 5 (low refractive index and high dispersion material 11) and a glass substrate (hereinafter referred to as "flat glass plate" in some cases) 13 having a thickness of 2 mm were arranged in this order on a mold 12 having a diffraction grating shape. After curing was performed by light irradiation using a high pressure mercury lamp (EXECURE250, Hoya Cande Optronics Corp.) at 14.2 mW/cm$^2$ for 211 seconds and at 20 mW/cm$^2$ for 600 seconds (illuminance through the flat glass plate 13, illuminance meter: UIT-250, light receiving portion: UVD-S365), as shown in FIG. 6B, the ITO fine-particle dispersion material 5 was removed from the mold. Subsequently, annealing was performed in the air at 80° C. for 72 hours, so that a diffraction grating was formed.

The grating height of the diffraction grating measured after the annealing was set to 10.8 μm, the distance from the glass substrate 13 to the valley of the grating was set to 2 μm (the average thickness of the ITO fine-particle dispersion material 5 was 7.4 μm), and the pitch was 80 μm.

Next, the ITO fine-particle dispersion material 5 molded on the flat glass plate 13 was set together therewith in a molding jig 15, and unlike the case of the multilayer diffractive optical element 420, the high refractive index and low dispersion material 22 was dripped as the high refractive index material 10 on the ITO fine-particle dispersion material 5 instead of using the high refractive index and low dispersion material 21 (FIG. 7A). Another flat glass plate 13 was provided thereon to extend the high refractive index material 10 by pressure application so that the thickness of the resin was larger than the height of the grating by 30 μm, thereby forming a sample (FIG. 7C). After the sample thus prepared was cured by light irradiation using a high pressure mercury lamp (EXECURE250, Hoya Cande Optronics Corp.) at 14.2 mW/cm$^2$ for 211 seconds and at 20 mW/cm$^2$ for 600 seconds (illuminance through the flat glass plate 13, illuminance meter: UIT-250, light receiving portion: UVD-S365), annealing was performed at 80° C. for 72 hours.

Accordingly, a multilayer diffractive optical element 430 was formed. In FIG. 7C, the structure of the multilayer diffractive optical element 430 is shown (the structure is the same as that of the multilayer diffractive optical element 420).

<Evaluation of Diffraction Efficiency of Multilayer Diffractive Optical Element>

The evaluation was performed in accordance with the evaluation method of an optical element for refractive index measurement.

<Evaluation of Light Resistance of Multilayer Diffractive Optical Element>

The evaluation was performed in accordance with the evaluation method of an optical element for refractive index measurement.

<Change with Time of Multilayer Diffractive Optical Element (Evaluation by Oxygen Acceleration Test)>

The evaluation was performed in accordance with the evaluation method of an optical element for refractive index measurement.

<Evaluation Results>

Initial Evaluation Results

In the multilayer diffractive optical elements 420 and 430 each formed from the low refractive index and high dispersion material 11 and the high refractive index and low dispersion material 21, the diffraction efficiency in the whole visible region was 99.5% or more.

The low refractive index and high dispersion material 11 of the optical element 220 for refractive index measurement had refractive indices $(n_g, n_f, n_e, n_d, n_C)$=(1.600, 1.588, 1.577, 1.569, 1.558) and $(v_d, \theta_{gF})$=(19.4, 0.41).

The low refractive index and high dispersion material 11 of the optical element 340 for refractive index measurement had refractive indices $(n_g, n_f, n_e, n_d, n_C)$=(1.601, 1.589, 1.578, 1.570, 1.560) and $(v_d, \theta_{gF})$=(19.6, 0.41).

The low refractive index and high dispersion material 11 of the optical element 350 for refractive index measurement had refractive indices $(n_g, n_f, n_e, n_d, n_C)$=(1.600, 1.588, 1.576, 1.568, 1.557) and $(v_d, \theta_{gF})$=(18.8, 0.40).

The low refractive index and high dispersion material 11 of the optical element 360 for refractive index measurement had refractive indices $(n_g, n_f, n_e, n_d, n_C)$=(1.600, 1.588, 1.577, 1.569, 1.558) and $(v_d, \theta_{gF})$=(19.1, 0.41).

The low refractive index and high dispersion material 11 of the optical element 370 for refractive index measurement had refractive indices $(n_g, n_f, n_e, n_d, n_C)$=(1.601, 1.589, 1.578, 1.570, 1.560) and $(v_d, \theta_{gF})$=(19.6, 0.41).

The evaluation results of the light resistance are shown in Table 1.

As the results of the light resistance, the case in which the change in the diffraction efficiency was 0.5% or less or the change in the refractive index was less than 0.002 was ranked as A, and the case in which the change in the diffraction efficiency was more than 0.5% or the change in the refractive index was 0.002 or more was ranked as B.

In the multilayer diffractive optical elements 420 and 430 each formed from the low refractive index and high dispersion material 11 and the high refractive index and low dispersion material 21, the diffraction efficiency in part of the visible region was changed from the initial value to 98.8% or less and was out of an acceptable range of 99.0% or more.

(Refractive Index and Optical Constant)

The low refractive index and high dispersion material 11 of the optical element 220 for refractive index measurement had refractive indices $(n_g, n_f, n_e, n_d, n_C)$=(1.599, 1.586, 1.574, 1.567, 1.556) and $(v_d, \theta_{gF})$=(18.6, 0.40), and the change in the refractive index from the initial value was considerable, such as −0.001 to −0.002, and was out of the acceptable range.

The low refractive index and high dispersion material 11 of the optical element 340 for refractive index measurement had refractive indices $(n_g, n_f, n_e, n_d, n_C)$=(1.600, 1.587, 1.576, 1.568, 1.557) and $(v_d, \theta_{gF})$=(18.8, 0.41), and the change in the refractive index from the initial value was considerable, such as −0.001 to −0.002, and was out of the acceptable range.

The low refractive index and high dispersion material 11 of the optical element 350 for refractive index measurement had refractive indices $(n_g, n_f, n_e, n_d, n_C)$=(1.600, 1.587, 1.576, 1.568, 1.557) and $(v_d, \theta_{gF})$=(18.9, 0.41), and the change in the refractive index from the initial value was hardly observed and was within the acceptable range.

The low refractive index and high dispersion material 11 of the optical element 360 for refractive index measurement had refractive indices $(n_g, n_f, n_e, n_d, n_C)$=(1.600, 1.587, 1.576, 1.568, 1.557) and $(v_d, \theta_{gF})$=(18.8, 0.41), and the change in the refractive index from the initial value was −0.000 to −0.001 and was within the acceptable range.

The low refractive index and high dispersion material 11 of the optical element 370 for refractive index measurement had refractive indices $(n_g, n_f, n_e, n_d, n_C)$=(1.600, 1.588, 1.576, 1.568, 1.557) and $(v_d, \theta_{gF})$=(18.6, 0.41), and the change in the refractive index from the initial value was considerable, such as −0.001 to −0.003, and was out of the acceptable range.

<Results of Oxidation Acceleration Test>

The results of the oxidation acceleration test are shown in Table 1.

A travel distance of oxidation of 2.5 mm or less (2.5 mm) was ranked as A, a travel distance of more than 2.5 mm to 10 mm was ranked as B, and a travel distance of more than 10 mm was ranked as C.

(Travel Speed of Oxidation, Refractive Index, and Optical Constant)

In the optical element 220 for refractive index measurement, the travel distance of oxidation from the end portion was 15.3 mm which was larger than the width of 2.5 mm of the annular zone and was extended in the effective diameter zone by 12.8 mm.

An oxidized portion of the low refractive index and high dispersion material 11 had refractive indices $(n_g, n_f, n_e, n_d, n_C)$=(1.601, 1.589, 1.578, 1.572, 1.561) and $(v_d, \theta_{gF})$=(20.3, 0.42), and the change in the refractive index from the initial value was +0.001 to +0.002 and was out of the acceptable range.

In the optical element 340 for refractive index measurement, the travel distance of oxidation from the end portion was 2.3 mm which was within the width of 2.5 mm of the annular zone. Since the end portion was small, the refractive index could not be measured.

In the optical element 350 for refractive index measurement, the travel distance of oxidation from the end portion was 15.3 mm which was larger than the width of 2.5 mm of the annular zone and was extended in the effective diameter zone by 12.8 mm.

An oxidized low refractive index and high dispersion material 11 had refractive indices $(n_g, n_f, n_e, n_d, n_C)$=(1.602, 1.590, 1.580, 1.573, 1.562) and $(v_d, \theta_{gF})$=(20.5, 0.42), and the change in the refractive index from the initial value was +0.002 to +0.005 and was out of the acceptable range.

In the optical element 360 for refractive index measurement, the travel distance of oxidation from the end portion was 15.3 mm which was larger than the width of 2.5 mm of the annular zone and was extended in the effective diameter zone by 12.8 mm.

An oxidized low refractive index and high dispersion material 11 had refractive indices $(n_g, n_f, n_e, n_d, n_C)$=(1.602, 1.590, 1.580, 1.573, 1.562) and $(v_d, \theta_{gF})$=(20.5, 0.42), and the change in the refractive index from the initial value was +0.002 to +0.004 and was out of the acceptable range.

In the optical element 370 for refractive index measurement, the travel distance of oxidation from the end portion was 15.3 mm which was larger than the width of 2.5 mm of the annular zone and was extended in the effective diameter zone by 12.8 mm.

An oxidized low refractive index and high dispersion material 11 had refractive indices $(n_g, n_f, n_e, n_d, n_C)$=(1.602, 1.590, 1.580, 1.573, 1.562) and $(v_d, \theta_{gF})$=(20.5, 0.42), and the change in the refractive index from the initial value was +0.001 to +0.003 and was out of the acceptable range.

In the multilayer diffractive optical element 420, the travel distance of oxidation from the end portion was 2.3 mm which was within the width of 2.5 mm of the annular zone. The change in the diffraction efficiency and inconveniences of the whole element were not observed.

In the multilayer diffractive optical element 430, the travel distance of oxidation from the end portion was 15.3 mm which was larger than the width of 2.5 mm of the annular zone and was extended in the effective diameter zone by 12.8 mm.

When the diffraction efficiency of an oxidized element portion was measured, the diffraction efficiency in part of the visible region was changed from the initial value to 98.8% or less and was out of an element acceptable range of 99.0% or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-211112 filed Sep. 27, 2011, which is hereby incorporated by reference herein in its entirety.

What is claimed is:

1. A diffractive optical element comprising:
   a first substrate having a surface including a first region, and a second region that surrounds the first region;
   a first member containing fine particles of a transparent conductive material provided on the first region;
   a second member provided on the second region so as to contact with the first substrate, and on the first member so as to contact with the first member; and
   a second substrate provided on the second member,
   wherein at least a part of an interface where the first member and the second member contact has a diffraction grating shape, and
   wherein the second member has an oxygen permeability of $2.0 \times 10^{-11}$ cm$^3$·cm·(cm$^2$·s·cmHg)$^{-1}$ or less.

2. The diffractive optical element according to claim 1, wherein the second member has an oxygen solubility of $1.4 \times 10^{-3}$ cm$^3$·(cm$^2$·cmHg)$^{-1}$ or more, which is higher than that of the first member.

3. The diffractive optical element according to claim 1, wherein the fine particles of the transparent conductive material have a number average particle diameter of 1 to 100 nm.

4. The diffractive optical element according to claim 1, wherein a content of the fine particles of the transparent conductive material of the first member is 1 to 29 percent by volume with respect to a volume of the first member.

5. The diffractive optical element according to claim 1, wherein the first member includes at least one of an acrylic resin, a vinyl resin, and an epoxy resin.

6. The diffractive optical element according to claim 1, wherein when a refractive index of the first member is represented by nd1, an Abbe's number of the first member is represented by v1, a refractive index of the second member is represented by nd2, and an Abbe's number of the second member is represented by v2, nd1<nd2 and v1<v2 hold.

7. The diffractive optical element according to claim 1, wherein the first substrate and the second substrate are glass substrates.

8. A diffractive optical element comprising:
   a first substrate having a surface including a first region and a second region that surrounds the first region;
   a first member containing fine particles of a transparent conductive material provided on the first region;

a second member provided on the first member so as to contact with the first member;

a third member provided on the second region so as to contact with the first member; and a second substrate provided on the second member and the third member, wherein at least a part of an interface where the first member and the second member contact has a diffraction grating shape, wherein the third member has an oxygen permeability of $2.0 \times 10^{-11}$ cm$^3$·cm·(cm$^2$·s·cmHg)$^{-1}$ or less, and wherein the third member and the second member are in contact with each other.

9. The diffractive optical element according to claim 8, wherein the second member has an oxygen solubility of $1.4 \times 10^{-3}$ cm$^3$·(cm$^2$·cmHg)$^{-1}$ or more, which is higher than that of the first member.

10. The diffractive optical element according to claim 8, wherein the transparent conductive material includes one of indium tin oxide, antimony-doped tin oxide, and zinc oxide.

11. The diffractive optical element according to claim 8, wherein the fine particles of the transparent conductive material have a number average particle diameter of 1 to 100 nm.

12. The diffractive optical element according to claim 8, wherein a content of the fine particles of the transparent conductive material of the first member is 1 to 29 percent by volume with respect to a volume of the first member.

13. The diffractive optical element according to claim 8, wherein the first member includes at least one of an acrylic resin, a vinyl resin, and an epoxy resin.

14. The diffractive optical element according to claim 8, wherein when a refractive index of the first member is represented by nd1, an Abbe's number of the first member is represented by ν1, a refractive index of the second member is represented by nd2, and an Abbe's number of the second member is represented by ν2, nd1<nd2 and ν1<ν2 hold.

15. The diffractive optical element according to claim 8, wherein the first substrate and the second substrate are glass substrates.

* * * * *